United States Patent [19]
Lennen

[11] Patent Number: 5,923,287
[45] Date of Patent: Jul. 13, 1999

[54] COMBINED GPS/GLONASS SATELLITE POSITIONING SYSTEM RECEIVER

[75] Inventor: Gary R. Lennen, Cupertino, Calif.

[73] Assignee: Trimble Navigation Limited, Sunnyvale, Calif.

[21] Appl. No.: 08/831,095

[22] Filed: Apr. 1, 1997

[51] Int. Cl.[6] ................................................ G01B 11/02
[52] U.S. Cl. ........................................... 342/357; 701/213
[58] Field of Search ........................... 342/357; 455/314; 701/213

[56] References Cited

U.S. PATENT DOCUMENTS

| | | | |
|---|---|---|---|
| 5,293,170 | 3/1994 | Lorenz et al. | |
| 5,486,834 | 1/1996 | Lennen . | |
| 5,557,524 | 9/1996 | Maki . | |
| 5,606,736 | 2/1997 | Hasler et al. | 455/314 |
| 5,621,416 | 4/1997 | Lennen | 342/357 |
| 5,724,046 | 3/1998 | Martin et al. | 342/357 |

*Primary Examiner*—Mark Hellner
*Attorney, Agent, or Firm*—Boris G. Tankhilevich

[57] ABSTRACT

A combined GPS/GLONASS Receiver is disclosed. The GLONASS system of satellites operates at a higher orbit inclination than GPS satellites (64° for GLONASS, 55° for GPS). This leads to GLONASS having better coverage at higher latitudes, e.g. in the State of Alaska or Northern Europe. The combined GPS/GLONASS receiver incorporates this advantage. Another advantage of using the GPS/GLONASS receiver is that GLONASS can become a back up system when the US Government intentionally degrades the GPS system accuracy via Selective Availability (SA). The combined GPS/GLONASS Receiver can receive signals from more satellites and therefore has more resistance to jamming than a single GPS or GLONASS Receiver.

26 Claims, 13 Drawing Sheets

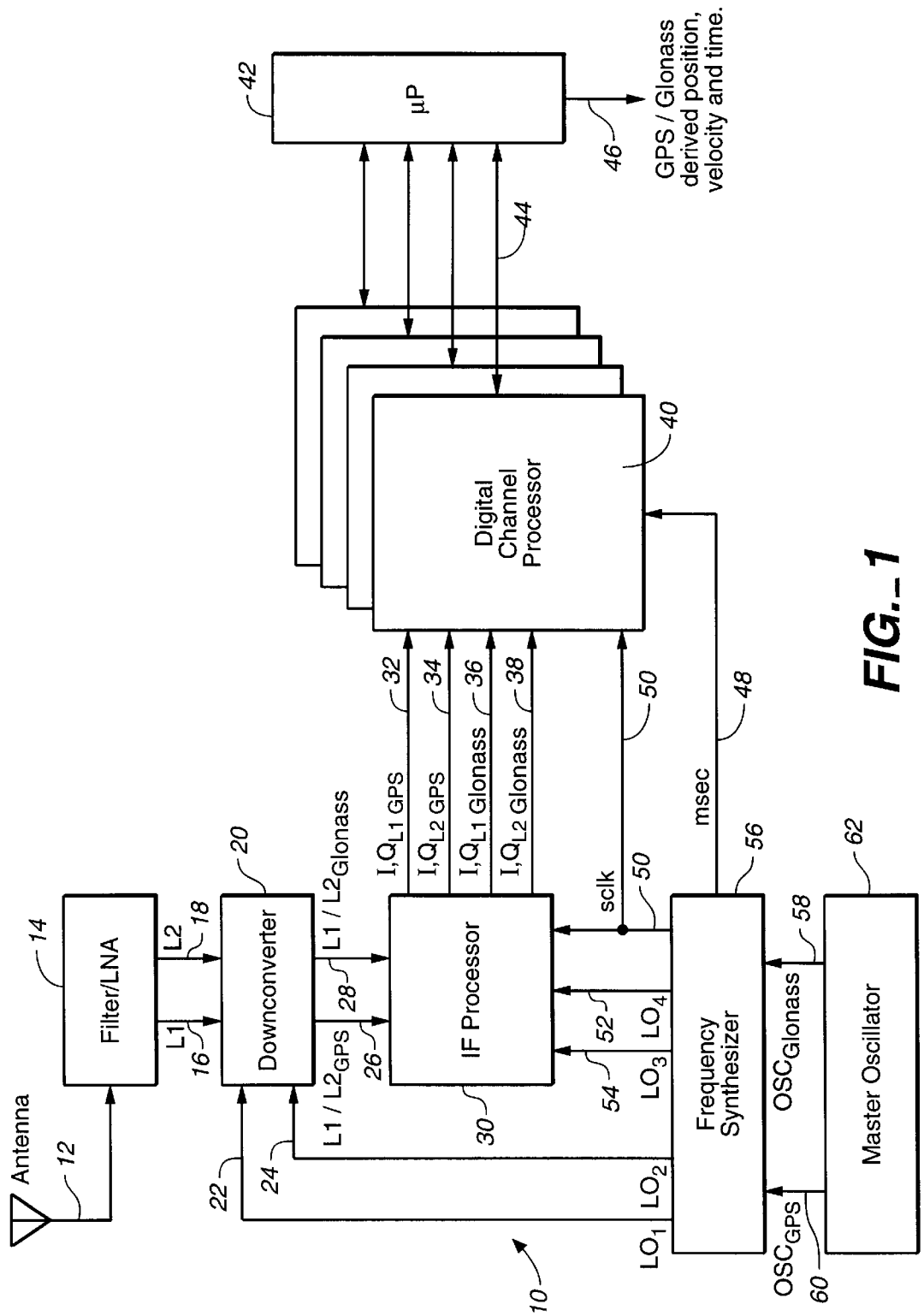
FIG._1

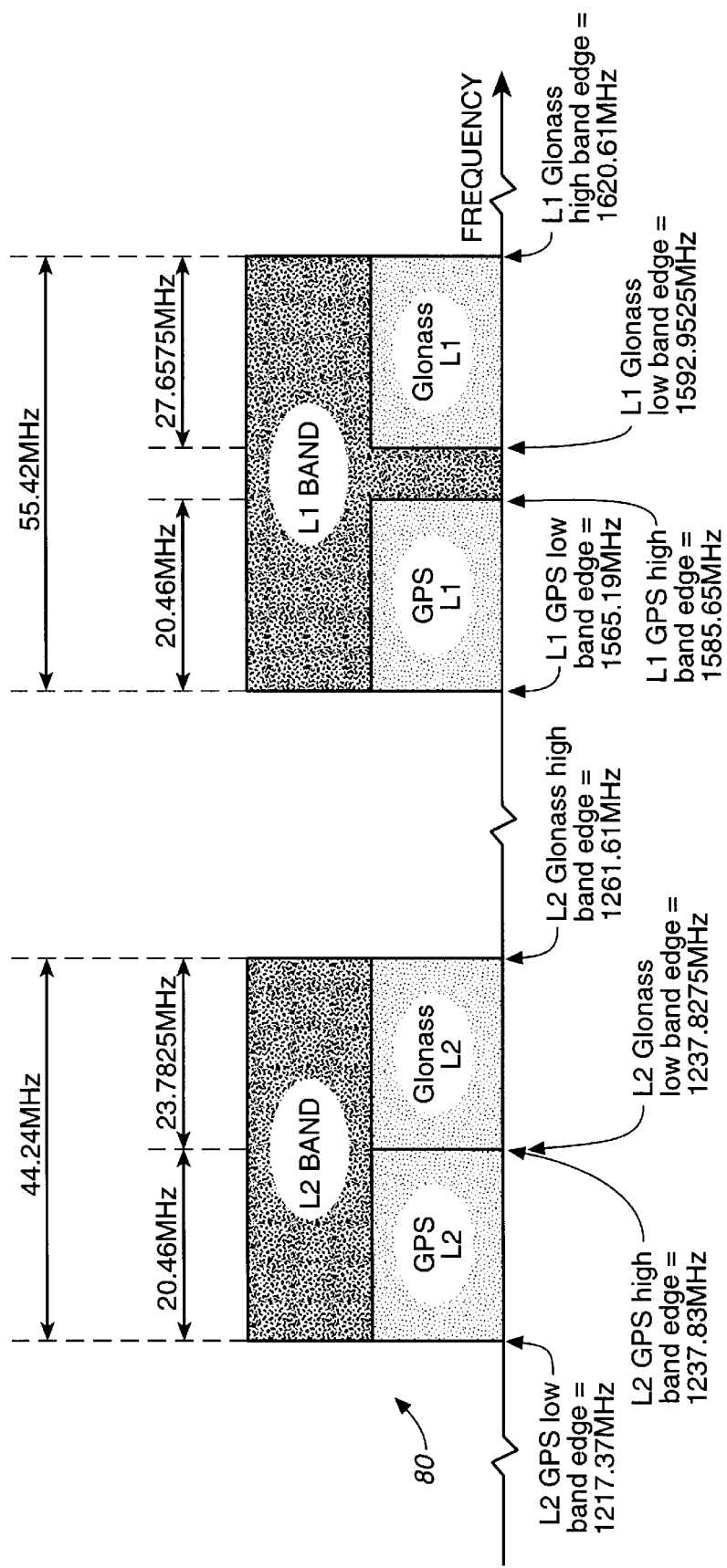
FIG._2

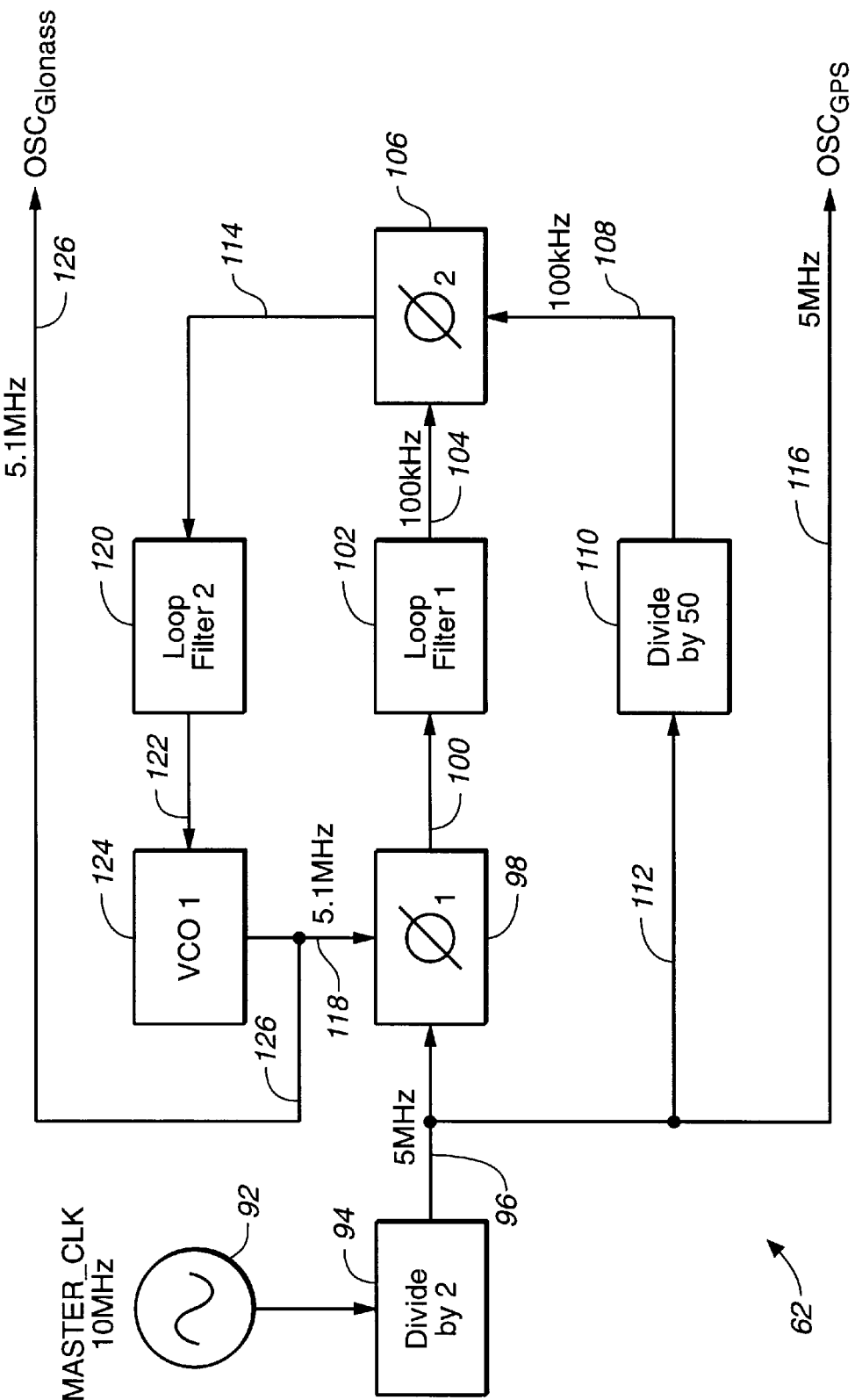
FIG._3

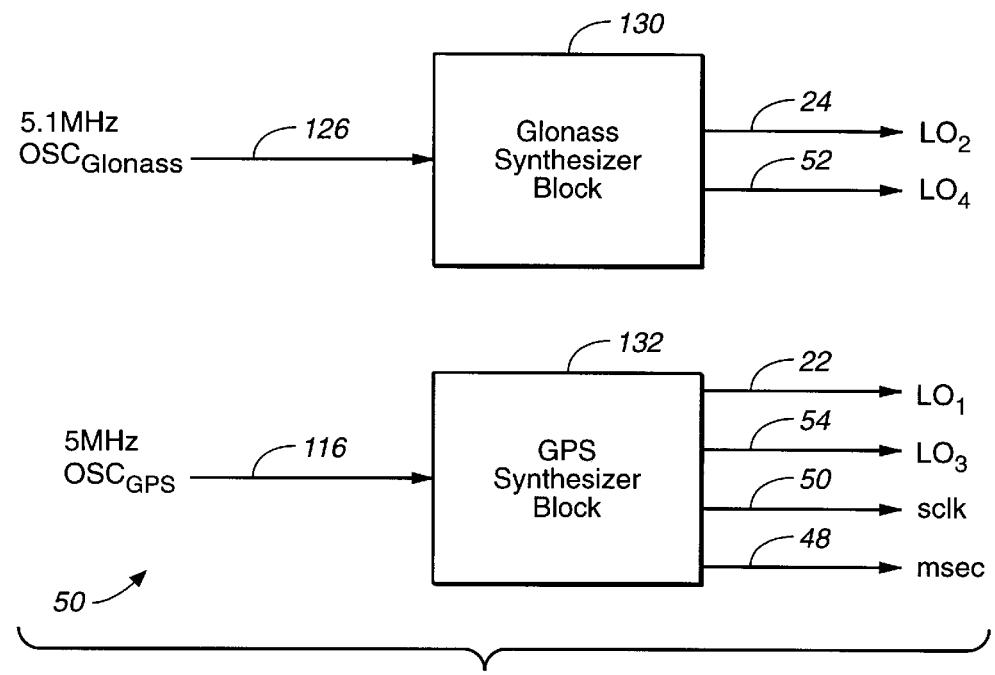
FIG._4
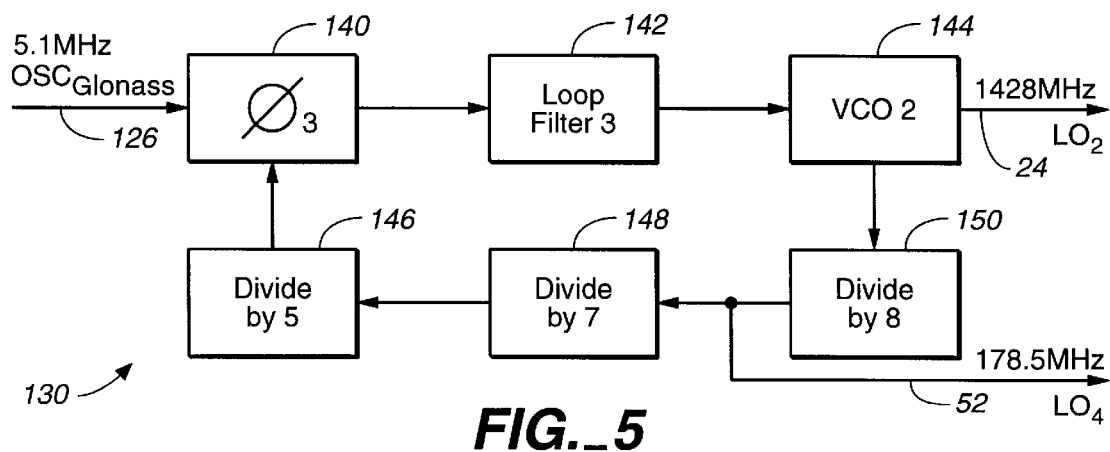
FIG._5

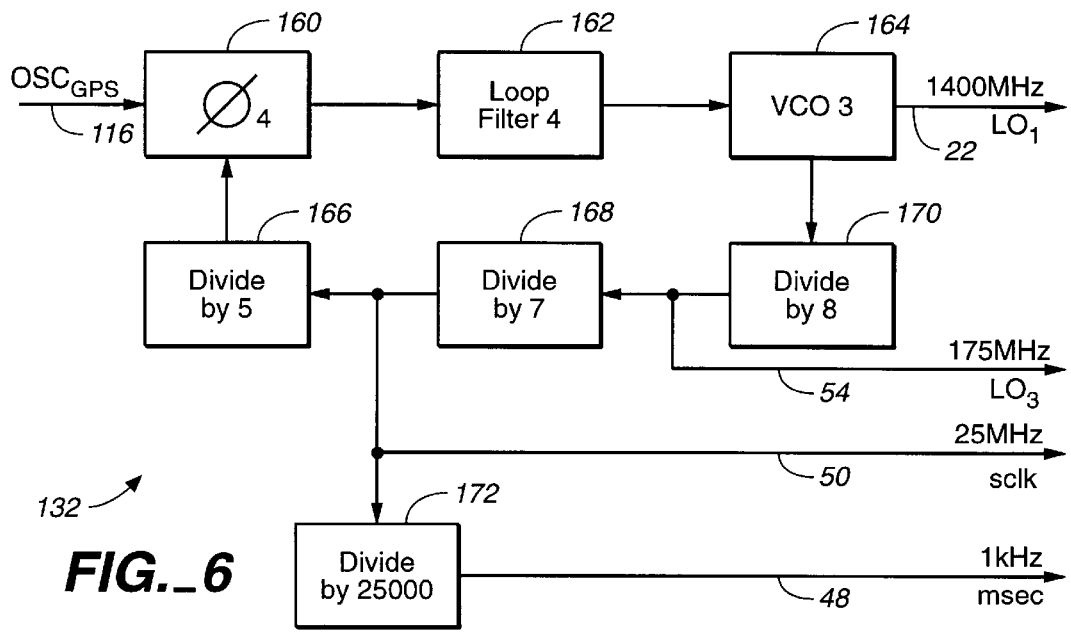
FIG._6
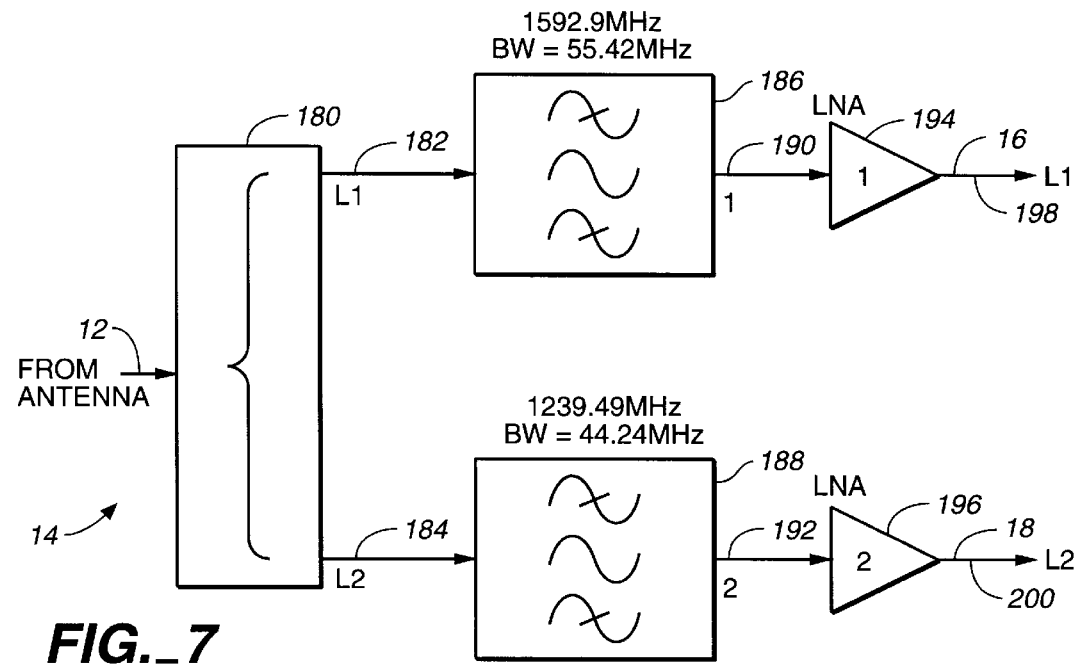
FIG._7

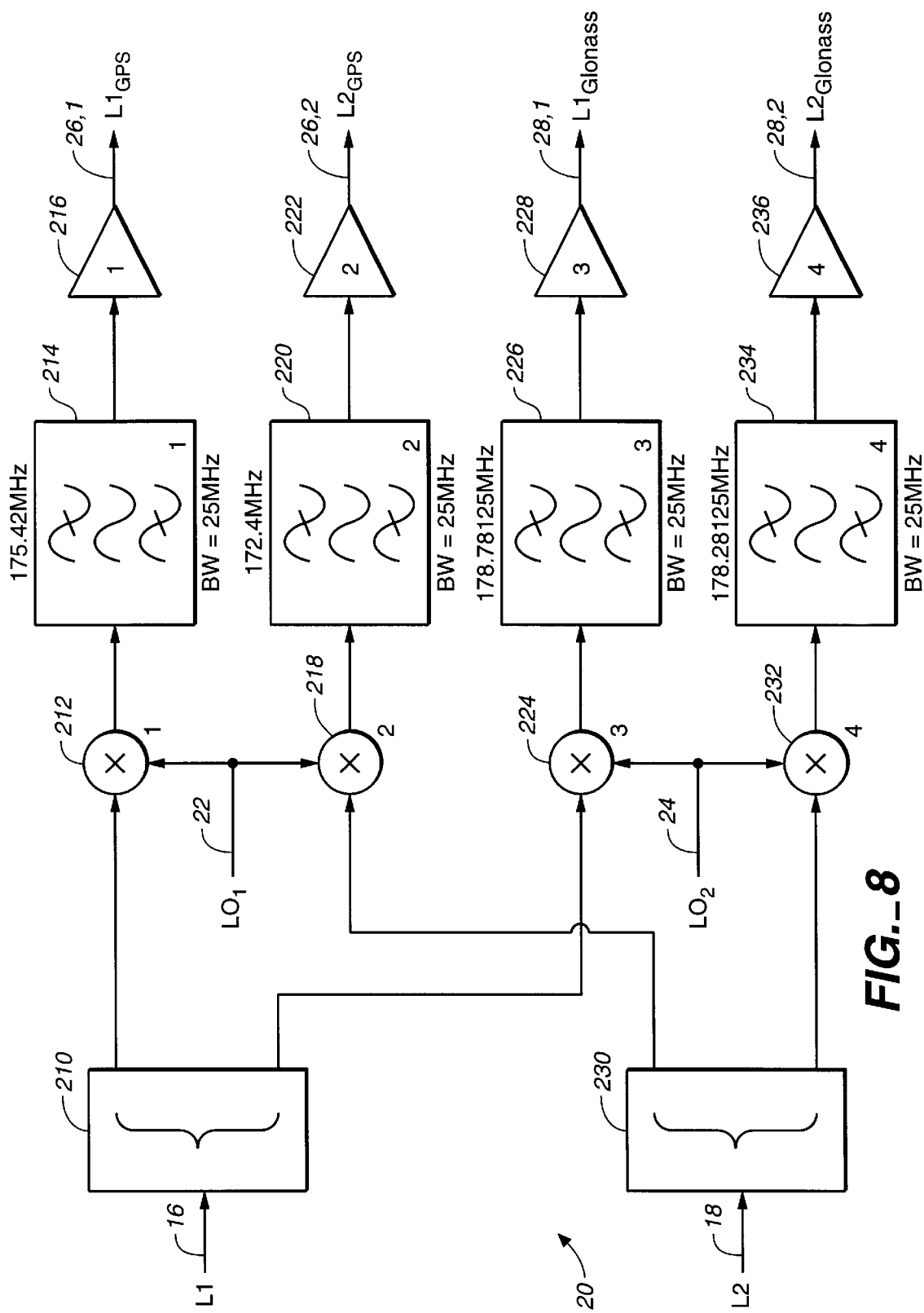
FIG._8

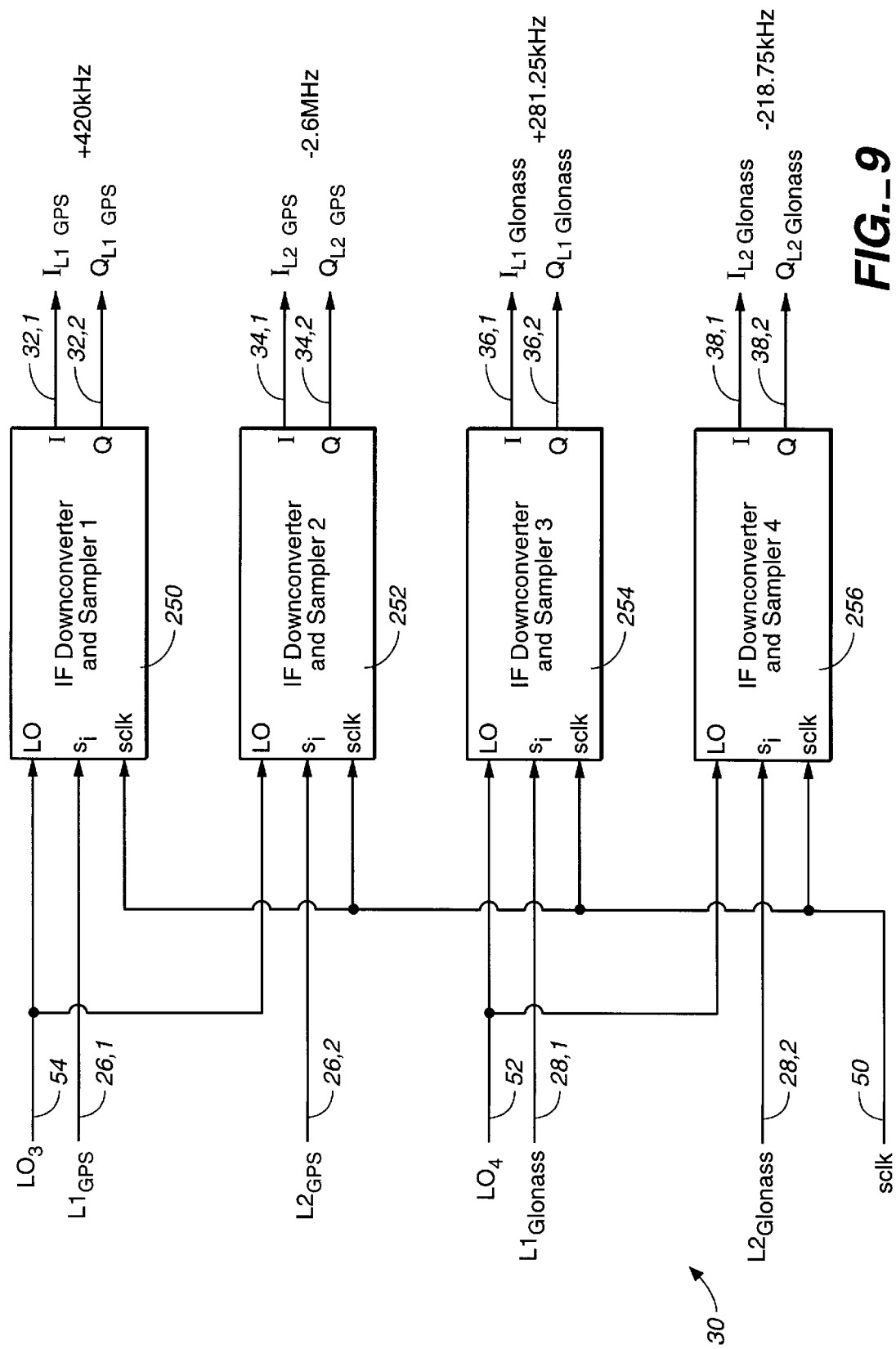

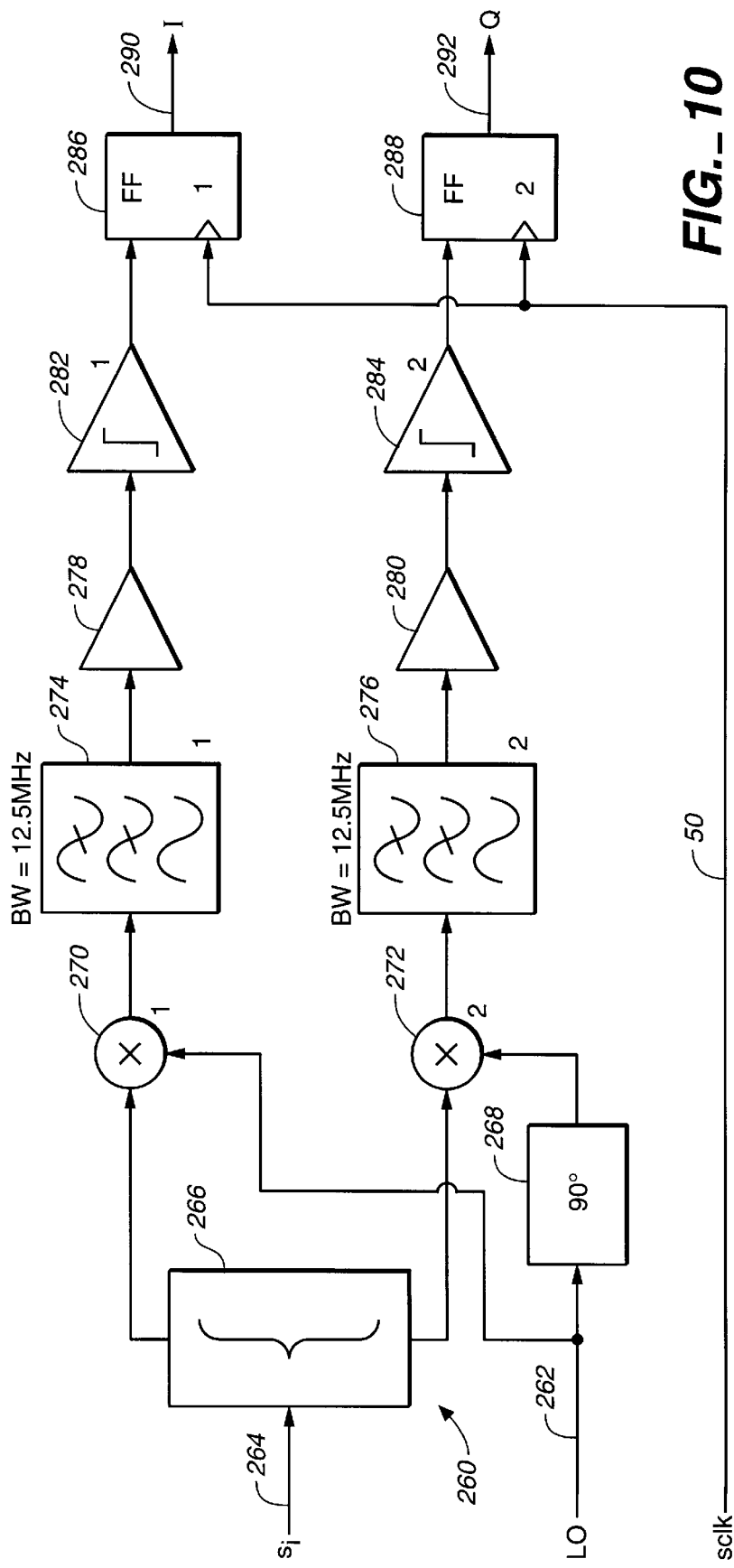
FIG._10

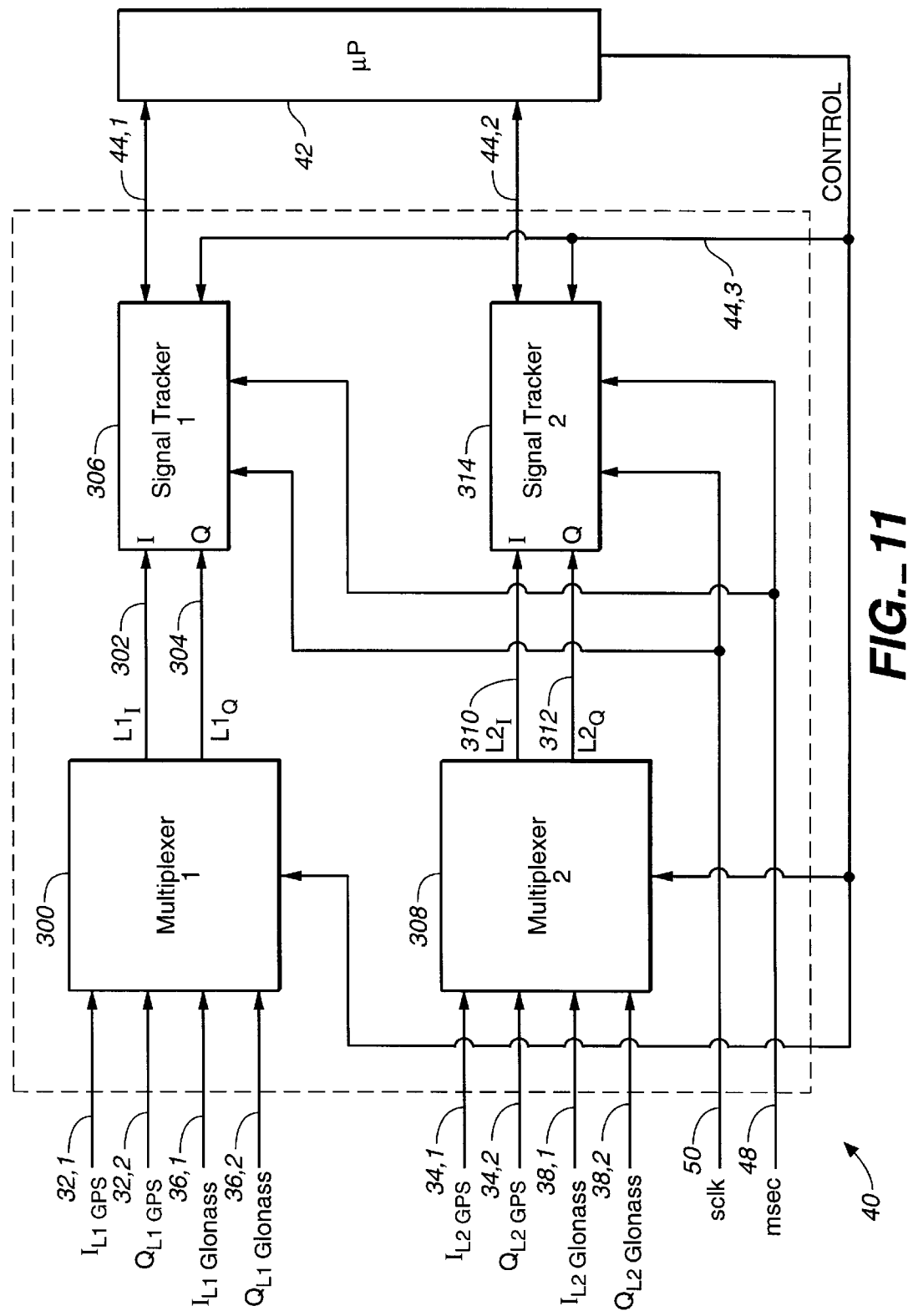
FIG._11

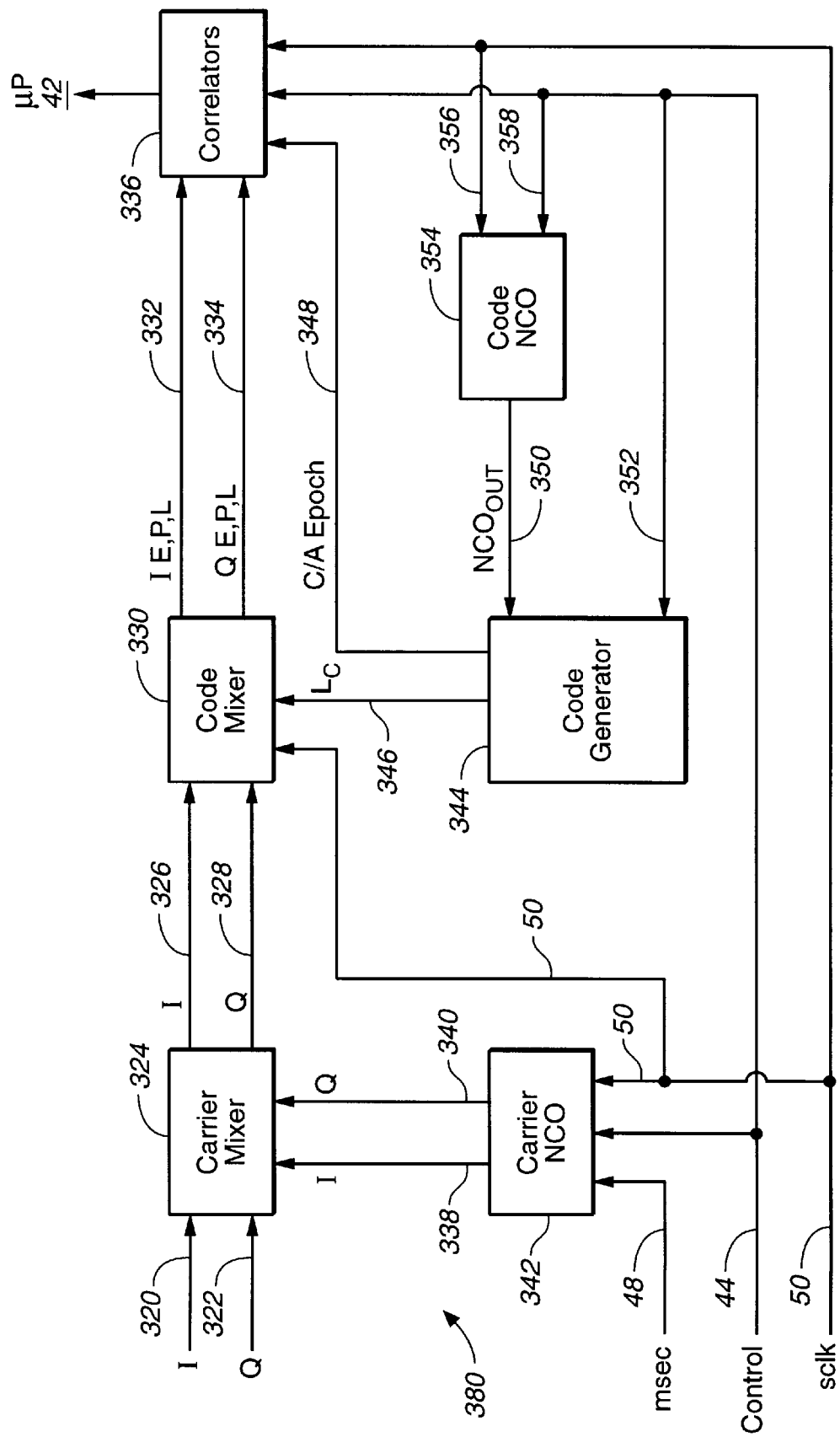
FIG._12

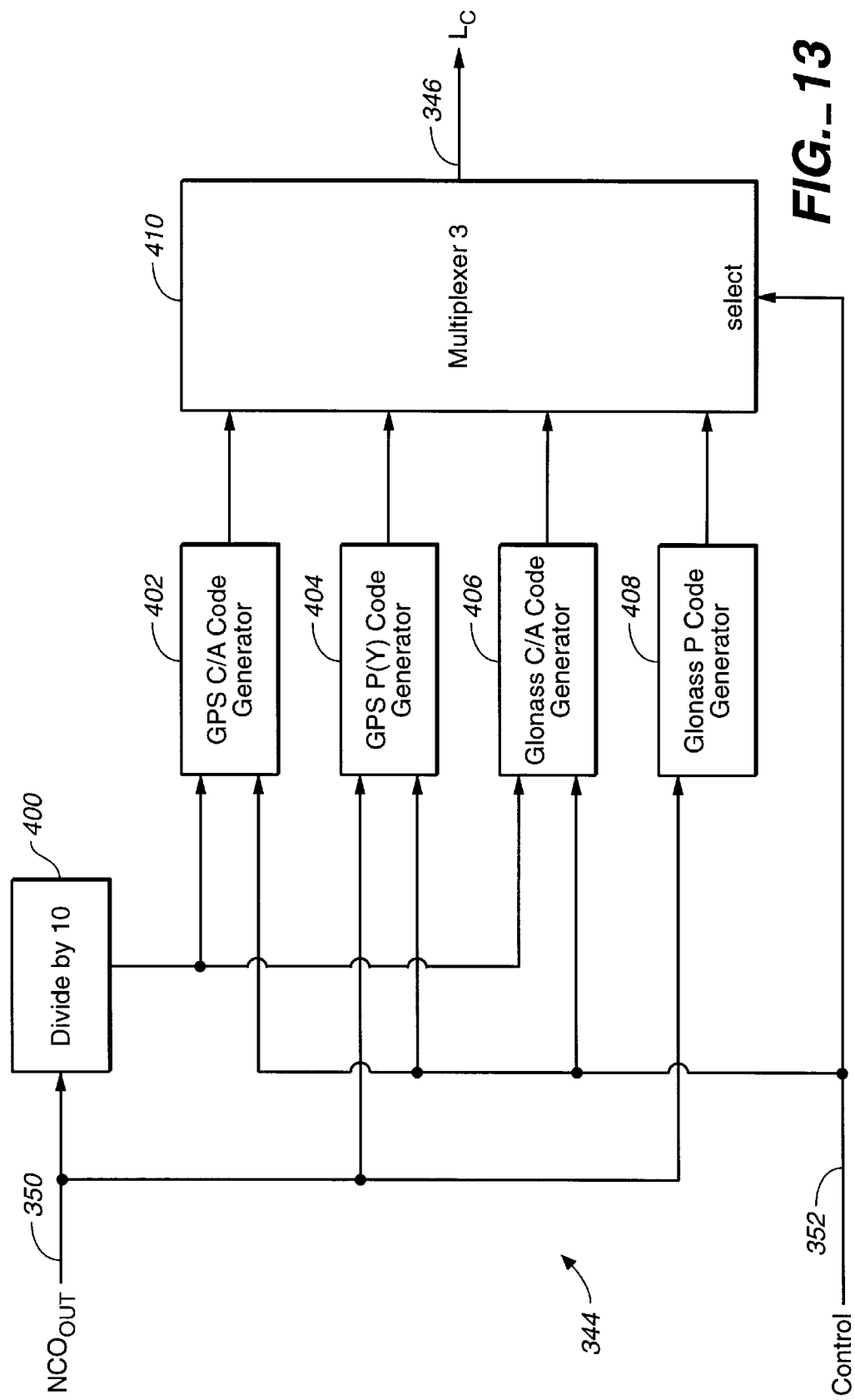
FIG._13

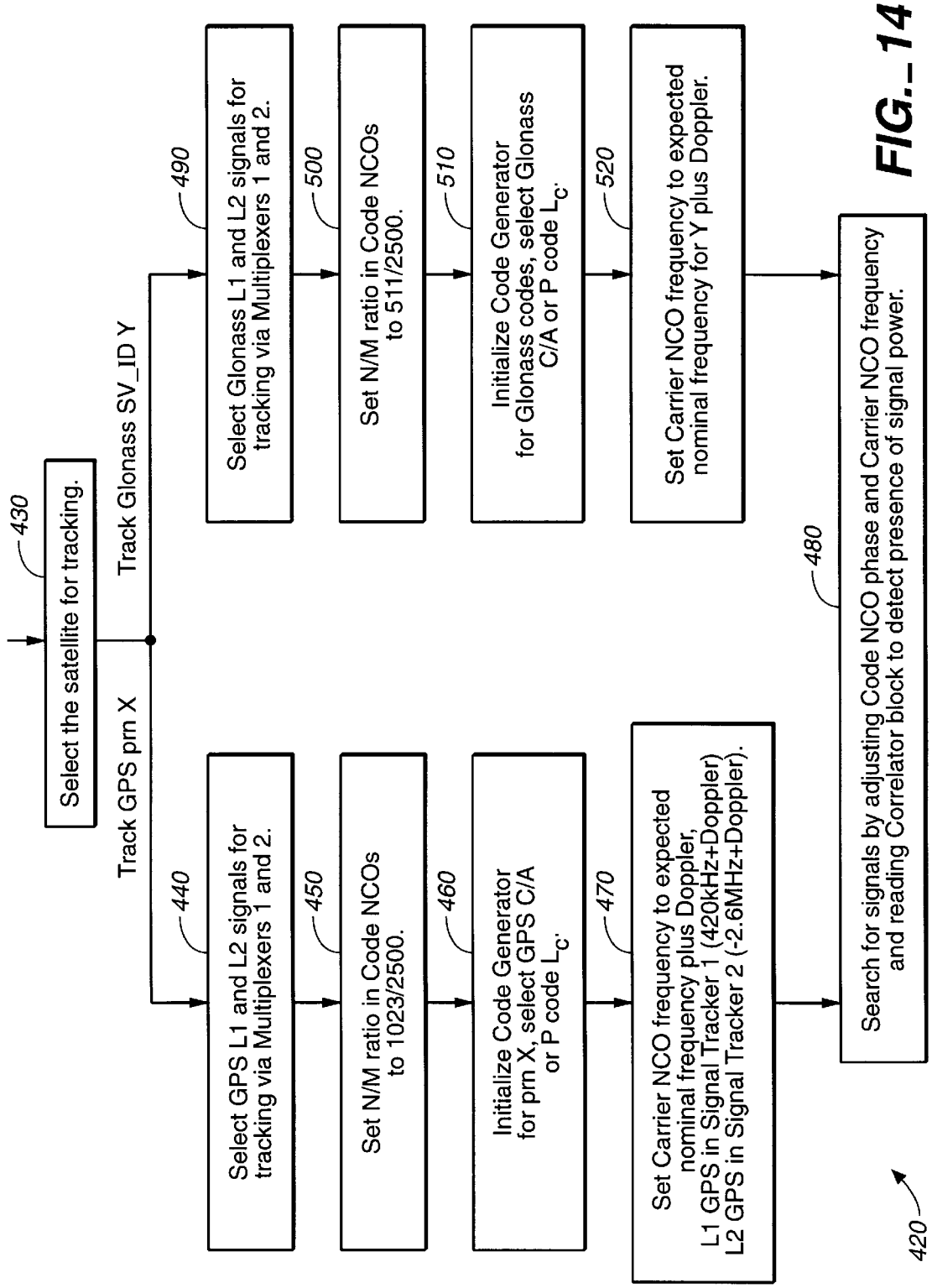
FIG._14

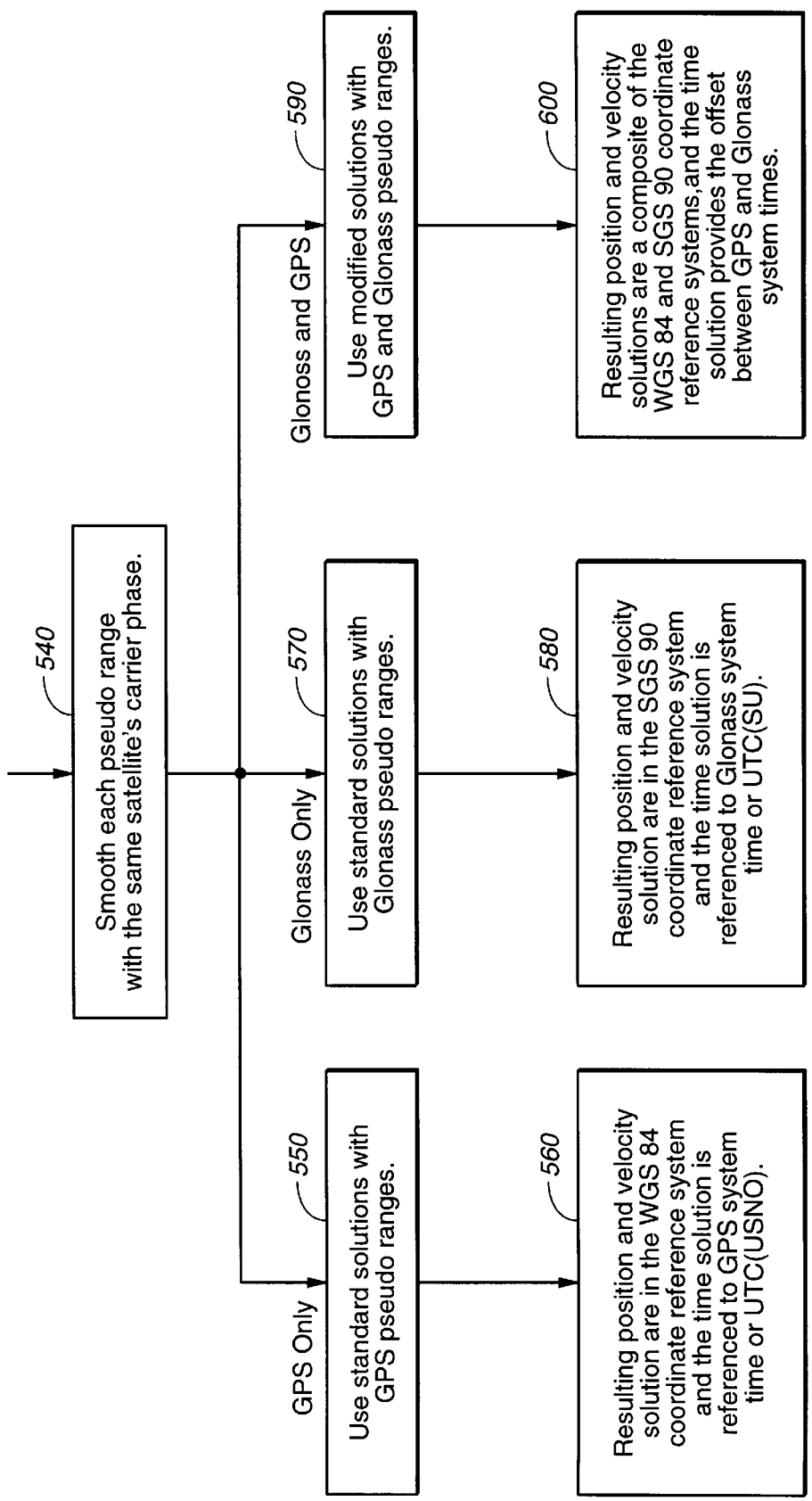

COMBINED GPS/GLONASS SATELLITE POSITIONING SYSTEM RECEIVER

BACKGROUND

The invention relates to a combined GPS/GLONASS satellite positioning system receiver.

The GPS is a system of satellite signal transmitters, with receivers located on the Earth's surface or adjacent to the Earth's surface, that transmits information from which an observer's present location and/or the time of observation can be determined.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an $L1_{GPS}$ signal having a frequency f1=1575.42 MHz and an $L2_{GPS}$ signal having a frequency f2=1227.6 MHz. These two frequencies are integral multiplies f1=1540 f0 and f2=1200 f0 of a base frequency f0=1.023 MHz. The $L1_{GPS}$ signal from each satellite is binary phase shift key (BPSK) modulated by two pseudo-random noise (PRN) codes in phase quadrature, designated as the C/A-code and P-code. The $L2_{GPS}$ signal from each satellite is BPSK modulated by only the P-code. The nature of these PRN codes is described below.

One motivation for use of two carrier signals $L1_{GPS}$ and $L2_{GPS}$ is to allow partial compensation for propagation delay of such a signal through the ionosphere, which delay varies approximately as the inverse square of signal frequency f (delay~$f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies $L1_{GPS}$ and $L2_{GPS}$ from the spacecraft to the receiver using a cross correlator. A variable delay is adjusted relative to a fixed delay in the respective channels $L1_{GPS}$ and $L2_{GPS}$ to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A -code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, N.Y., 1992, pp. 17–90.

The Global Orbiting Navigation Satellite System (GLONASS) has been placed in orbit by the former Soviet Union and now is maintained by the Russian Republic. The GLONASS system also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals $L1_{GLONASS}$ and $L2_{GLONASS}$ with frequencies of f1=(1.602+9k/16) GHz and f2=(1.246+7k/16) GHz, where k (=1, 2, . . . 24) is the channel or satellite number. These frequencies lie in two bands at 1.597–1.617 GHz ($L1_{GLONASS}$) and 1,240–1,260 GHz ($L2_{GLONASS}$). The $L1_{GLONASS}$ code is modulated by a C/A- code (chip rate=0.511 MHz) and by a P-code (chip rate=5.11 MHz). The $L2_{GLONASS}$ code is presently modulated only by the P-code. The GLONASS satellites also transmit navigational data at a rate of 50 Baud. Because the channel frequencies are distinguishable from each other, the P-code is the same, and the C/A-code is the same, for each GLONASS satellite.

Both the GPS System and the Global Orbiting Navigation Satellite System (GLONASS) use transmission of coded radio signals, with the structure described above, from a plurality of Earth-orbiting satellites. A single antenna can receive both GPS and GLONASS signals and pass these signals to a signal Receiver/Processor, which (1) identifies the satellite source for each satellite signal, (2) determines the time at which each identified satellite signal arrives at the antenna, and (3) determines the present location of the satellite source.

The range between the location of the GPS and/or GLONASS satellite and the Receiver is equal to the speed of light c times the time difference between the Receiver's clock and the time indicated by the GPS or GLONASS satellite when it transmitted the relevant phase. However, the Receiver has an inexpensive quartz clock which is not synchronized with respect to the much more stable and precise atomic clocks carried on board the satellites. Consequently, the Receiver actually estimates not the true range to the satellite but only the pseudo-range to each GPS or GLONASS satellite.

Both GPS system and GLONASS systems were originally intended as stand alone systems. The GPS receiver design is disclosed by Charles Trimble in the U.S. Pat. No. 4,754,465 and the GLONASS receiver design is disclosed by Gary Lennen in the U.S. Pat. No. 5,486,834.

Although many applications operate with a Receiver designed to receive either GPS or GLONASS signals, many more applications can benefit substantially from combining the two systems in a single Receiver design. This patent application describes a Receiver design capable of producing and using high accuracy measurements from both GPS and GLONASS satellites simultaneously, thus acquiring the benefits associated with using both systems.

Typical applications which may benefit from use of both systems in the same Receiver are Surveying and Mapping, Aircraft navigation, Car Navigation, Marine Navigation, Land Navigation and Scientific Applications.

The use of both systems provides a high degree of system-wide integrity. If GPS or GLONASS suffers a system-wide failure then the Receiver will continue to operate with the remaining GPS or GLONASS operational systems. When both GPS and GLONASS systems are operational, measurement from each of them can be continually compared with the other one in order to detect the system-wide failures.

The system-wide failure includes not only the satellite failing in some manner, but also includes operating in environments where a heavy radio frequency interference is present. The radio interference affecting one system need not affect the other system because GPS and GLONASS operate in a different frequency band.

Each of GPS and GLONASS systems consist of 24 satellites, totalling 48 satellites with both systems. Theoretically, the number 24 in each system was chosen to provide worldwide continuous coverage because at least four satellites are always above the horizon in each system. In practice however, it has ben discovered that at least four satellites above the horizon is not adequate for many applications. For example, in some applications satellites are obscured by obstacles such as buildings, trees and mountains. Hence, the localized environment can prevent a receiving antenna from observing all 4 GPS satellites which may be above the horizon at the particular time of observation. If this is the case, the 4 additional GLONASS satellites above the horizon may be very useful in obtaining the position fixing. In another example, in the real-time kinematic surveying, five or more satellites are required for the operation of a Receiver even in the unobscured by obstacles environment.

Even if the four satellites are sufficient for the position fixing, providing the additional visible satellites leads to the possibility of selection of the four satellites with the minimum position dilution of precision (PDOP). Therefore, the accuracy of the resulting position, velocity, and time measurements can be improved.

In survey applications, more visible satellites lead to a reduction in the time needed to resolve carrier cycle ambiguities, hence improving the speed and integrity of the result.

The GLONASS system of satellites operate at a higher orbit inclination than GPS satellites (64° for GLONASS, 55° for GPS). This leads to GLONASS having better coverage at higher latitudes, e.g. in the State of Alaska or Northern Europe. A combined GPS/GLONASS receiver would incorporate this advantage.

Another advantage of using a GPS/GLONASS receiver is that GLONASS can become a back up system when the US Government intentionally degrades the GPS system accuracy via Selective Availability (SA). The Russian Government insists that it would not intentionally (or has no resources to) degrade the GLONASS system.

SUMMARY

The present invention is unique because it allows to design a combined GPS/GLONASS Receiver.

One aspect of the present invention is directed to an apparatus for receiving satellite signals generated by at least two satellite systems. The apparatus comprising: includes: (a) a Receiver circuit configured to receive the satellite signals from each satellite system; (b) a plurality of Digital Channel Processor circuits, wherein each Digital Channel Processor is configured to process received satellite signals emanating from a single satellite; and (c) a Microprocessor configured to extract the navigational information from each received satellite signal.

In the preferred embodiment, at least two satellite systems include a GPS satellite system and a GLONASS satellite system.

In one embodiment, the GPS system generates $L1_{GPS}$ and $L2_{GPS}$ signals, the GLONASS system generates $L1_{GLONASS}$ and $L^2 GLONASS$ signals. In another embodiment, the GPS system generates $L1_{GPS}$ and the GLONASS system generates $L1_{GLONASS}$ signals. In one more embodiment, the GPS system generates $L2_{GPS}$ and the GLONASS system generates $L2_{GLONASS}$ signals.

In the preferred embodiment, the Receiver circuit further includes: (1) an Antenna configured to receive the $L1_{GPS}$, $L2_{GPS}$, $L1_{GLONASS}$, and $L2_{GLONASS}$ signals; (2) a Filter/LNA circuit configured to perform the filtering and low noise amplification of the $L1_{GPS}$, $L2_{GPS}$, $L1_{GLONASS}$, and $L2_{GLONASS}$ signals; (3) a Downconverter circuit configured to convert down in frequency the $L1_{GPS}$, $L2_{GPS}$, $L1_{GLONASS}$, and $L2_{GLONASS}$ signals; and (4) an IF processor configured for further frequency translating and digitizing the $L1_{GPS}$, $L2_{GPS}$, $L1_{GLONASS}$, and $L2_{GLONASS}$ signals.

In the preferred embodiment, each Digital Channel Processor circuit further comprises: (1) a first multiplexer configured to select for further processing the $I_{L1\ GPS}$, $Q_{L1\ GPS}$, $I_{L1\ GLONASS}$, and $Q_{L1\ GLONASS}$ signals; (2) a first signal tracker configured to process the $I_{L1\ GPS}$, $Q_{L1\ GPS}$, $I_{L1\ GLONASS}$, and $Q_{L1\ GLONASS}$ signals; (3) a second multiplexer configured to select for further processing the $I_{L2\ GPS}$, $Q_{L2\ GPS}$, $I_{L2\ GLONASS}$, and $Q_{L2\ GLONASS}$ signals; and (4) a second signal tracker configured to process the $I_{L2\ GPS}$, $Q_{L2\ GPS}$, $I_{L2\ GLONASS}$, and $Q_{L2\ GLONASS}$ signals.

In one embodiment, each signal tracker further comprises: (1) a carrier mixer configured to further frequency translate the I and Q components of the incoming satellite signals to d. c. carrier frequency (0 Hz carrier frequency) I and Q components of the incoming satellite signals; (2) a carrier numerically controlled oscillator (NCO) configured to close the carrier tracking loop via the control of the Microprocessor system $\mu$P; (3) a code mixer circuit configured to mix the d. c. I and Q carrier components of the incoming satellite signals with the locally generated code $L_c$ signals at three time points Early (E), Punctual (P), and Late (L) on the autocorrelation function formed between the satellite code and local code; (4) a code generator configured to generate the code signals $L_c$; (5) a code NCO configured to drive the code generator; and (6) a correlators block configured to integrate the signals outputted by the code mixer over an integer period of C/A epoch signals.

One more aspect of the present invention is directed to a method for receiving satellite signals generated by GPS and GLONASS satellite systems. The method comprises the following steps: (1) selecting one satellite system that the apparatus is about to track; (2) selecting a plurality of visible satellites from the selected satellite system that the apparatus is about to track; (3) tracking at least one visible satellite from the selected satellite system; and (4) extracting the navigational information from the received satellite signals.

BRIEF DESCRIPTION OF THE DRAWINGS

FIG. 1 depicts a block-diagram of the combined GPS/GLONASS Receiver.

FIG. 2 shows a diagram of the relevant frequency bands for GPS/GLONASS L1/L2 reception in the combined GPS/GLONASS Receiver.

FIG. 3 depicts a Master Oscillator for generating timing signals $OSC_{GLONASS}$ and $OSC_{GPS}$.

FIG. 4 illustrates the Frequency Synthesizer block.

FIG. 5 depicts GLONASS Frequency Synthesizer block.

FIG. 6 shows GPS Frequency Synthesizer block.

FIG. 7 is an illustration of the Filter/LNA block.

FIG. 8 shows the Downconverter block.

FIG. 9 depicts the IF Processor.

FIG. 10 shows a typical IF Downconverter and Sampler of FIG. 9.

FIG. 11 illustrates a Digital Channel Processor block of FIG. 1.

FIG. 12 depicts the Signal Tracker block of FIG. 11.

FIG. 13 is an illustration of the block Code Generator of FIG. 12.

FIG. 14 shows the initialization process for the Digital Channel Processor.

FIG. 15 depicts combined GPS/GLONASS measurement processing.

FULL DESCRIPTION OF THE PREFERRED EMBODIMENT

FIG. 1 is an overview of the combined GPS/GLONASS receiver (10). The GPS/GLONASS L1 and L2 signals are received via the Antenna block 12. The Antenna block should be capable of receiving the L1 BAND and L2 BAND shown in FIG. 2 (see discussion below). An antenna of the type described in the U.S. Pat. No. 5,515,057 issued to Lennen et al "GPS Receiver With N-Point Symmetrical Feed Double-Frequency Patch Antenna" is appropriate if its characteristics are altered in such a way as to enable the antenna to pass the L1 BAND and L2 BAND of FIG. 2. Such an antenna has stable phase and group delay characteristics suitable for high accuracy applications utilizing GPS and GLONASS satellites. The signals are then filtered and amplified in the Filter/LNA (low noise amplifier) block 14.

The output signals L1 (16) and L2 (18) from the Filter/LNA block (14) are downconverted in frequency in the Downconverter block (20). The signals $L1/L2_{GPS}$ (26) and $L1/L2_{GLONASS}$ (28) are further frequency translated and then digitized in the IF Processor block (30). The digital signals output from the IF Processor $I/Q_{L1\ GPS}$ (32), $I/Q_{L2\ GPS}$ (34), $I/Q_{L1\ GLONASS}$ (36) and $I/Q_{L2\ GLONASS}$ (38) are further processed in the Digital Channel Processor blocks (40), wherein each Digital Channel Processor is configured to process the satellite signals from a single GPS or GLONASS satellite.

In the preferred embodiment, the number of Digital Channel Processors is equal to the maximum number of satellites expected to be received.

In one embodiment, when the two satellite system includes the 24 satellites of the GPS system and the 24 GLONASS system satellites, the maximum number of Digital Channel Processors is 48.

In another embodiment, when the Receiver is expected to track 12 GPS satellites and 12 GLONASS satellites, the GPS/GLONASS Receiver includes 24 Digital Channel Processors.

Interaction of the Digital Channel Processor blocks (40) and the Microprocessor system $\mu$P (42) facilitates tracking of GPS and GLONASS satellites, removal of satellite data streams and measurement of code and carrier phase from each satellite.

With large numbers of Digital Channel Processor blocks (40) present it is also pertinent to have a relatively powerful Microprocessor system $\mu$P (42). The powerful Microprocessor system $\mu$P can be implemented using the Power PC family of processors manufactured by Motorola, Schaumburg, Ill.

All clocks and frequencies in the Receiver (10) associated with the frequency translation, digitization, and measurement on the satellites are derived from a single oscillator included in the Master Oscillator block (62). Thus all measurements, whether GPS or GLONASS, can be referred to a single Receiver clock. This allows one to minimize the number of GPS/GLONASS satellites required for the position fixing. Indeed, the single oscillator used in the present invention to generate the GPS clock and the GLONASS clock has a single clock drift as opposed to the situation when two separate oscillators with two clock drifts are used to generate the GPS clock and the GLONASS clock. One additional clock drift would require one additional satellite for position fixing.

The Frequency Synthesizer block (56) is used to synthesize a number of frequencies and clocks used throughout the Receiver (10).

The portion of the GPS satellite signal structure intended for use in navigation applications, including L1 C/A and P code signals, and L2 C/A and P code signals, is described in detail in the "Interface Control Document" of Rockwell International Corporation entitled "Navstar GPS Space Segment/Navigation User Interfaces", dated Sep. 26, 1984, as revised Dec. 19, 1986, hereinafter referred to as the "ICD-GPS-200". The portion of the GLONASS satellite signal structure intended for use in navigation applications is described in detail in "Global Satellite Navigation System, GLONASS, Interface Control Document (Second Wording)", Russian Institute of Space Device Engineering/Research, 1991. This document describes only the GLONASS C/A code. The GLONASS P code was discovered and described by Gary R. Lennen in the paper "The USSR's GLONASS P-code—Determination and Initial results" given in the Proceedings of ION GPS-89, the Second International Technical Meeting of Satellite Division of the Institute of Navigation, Colorado Springs, Colo., Sept. 27–29, 1989. The Russian Government also indicated recently that it will make changes to the signal structure, including addition of GLONASS C/A code in L2 band and adjustment of carrier transmission frequencies. The present invention is capable of operating in the presence of these system enhancements.

FIG. 2 shows a diagram of the relevant frequency bands for GPS/GLONASS L1/L2 reception in the combined GPS/GLONASS Receiver. As was indicated above, the GPS satellites transmit C/A code and P code on two frequencies: L1=1575.42 MHz and L2=1227.6 MHz. All GPS satellites have the same nominal carrier frequencies offset by relatively small Doppler frequency and the Receiver clock frequency. Doppler frequency and the Receiver clock frequency offset are equal to a minimum of approximately 20 kHz. The GPS satellites are distinguished from each other by their unique C/A and P codes. The GPS satellite access is known in the art as Code Division Multiple Access. As depicted in FIG. 2 (80), GPS L1 and GPS L2 bands represent the receiving bandwidth for the first null of P code, e. g. center frequency (±) 10.23 MHz.

GLONASS satellites also transmit in two bands, L1 and L2. However, GLONASS satellites transmit on unique frequencies within each of these bands. The GLONASS L1 transmit frequency of a particular satellite is given by: [GLONASS L1=1602 MHz+(k×0.5625 MHz)]. Similarly, the GLONASS L2 transmit frequency of a particular satellite is given by: [GLONASS L2=1246 MHz+(k×0.4375 MHz)]. Here, k is a GLONASS satellite identification number between –7 and +24.

The GLONASS satellites are distinguishable within the Receiver by their carrier frequency, a process known as Frequency Division Multiple Access. GLONASS satellites which have antipodal orbits are capable of transmitting on the same carrier frequency but for the majority of applications receivers will not be able to observe both satellites at once and hence no interference or ambiguity is present. GLONASS satellites also transmit their own versions of C/A and P code, the same for all GLONASS satellites. Bandwidths given in FIG. 2 for GLONASS assume reception of the first null of the GLONASS P code transmission (±5.11 MHz). P code has wider bandwidth than C/A code bandwidth and hence receiving P code automatically includes receiving C/A code.

The L1 and L2 GPS bandwidths are 20.46 MHz. The L1 and L2 GLONASS bandwidths are 27.6575 MHz and 23.7825 MHz respectively. Combining both systems into an L1 and L2 bandwidth leads to an L1 bandwidth of 55.42 MHz and an L2 bandwidth of 44.24 MHz.

The Master Oscillator block (62) of FIG. 1 is shown in more detail in FIG. 3. The purpose of this block is to convert a single master clock (92) into two frequencies $OSC_{GLONASS}$ (126) and $OSC_{GPS}$ (116), which can be subsequently used by the Frequency Synthesizer block (56) of FIG. 1 to generate all other required clock frequencies. In the preferred embodiment, the Master Oscillator block (62) comprises a low noise crystal oscillator that generates a 10 MHz MASTER_CLK signal that is divided by 2 in the block (94) into 5 MHz signal (96). The 5 MHz signal (96) is further divided by 50 in the block (110) to generate a 100 kHz signal (108). The 5 MHz signal is phase detected against the output signal 5.1 MHz (118) of the Voltage Controlled Oscillator VCO 1 (124) in the first phase detector Θ1 (98). The output signal (100) from the first phase detector Θ1 (98) is filtered in the first Loop Filter 1 (102) to isolate the frequency difference between the 5 MHz signal and the 5.1 MHz signal. The output 100 kHz signal (104) from the first Loop Filter 1 is phase compared with the 100 kHz signal (108) in the second phase detector Θ2 (106). The output signal (114) from the second phase detector Θ2 (106) is filtered in the second Loop Filter 2 (120) before being applied to VCO 1 (124). VCO 1 nominally runs at a frequency close to 5.1 MHz. When the phase locked loop is formed in the Master Oscillator block (62), the output signal (118) of VCO 1 is phase and frequency locked to the 5 MHz signal (96). The Master Oscillator block (62) outputs two signals: $OSC_{GLONASS}$ 5.1 MHz signal (126) and $OSC_{GPS}$ 5 MHz signal (116).

FIG. 4 shows the Frequency Synthesizer block (56) comprising GLONASS Frequency Synthesizer block (130) and GPS Frequency Synthesizer block (132). FIG. 5 depicts GLONASS Frequency Synthesizer block (130) in more detail. The GLONASS Frequency Synthesizer block (130) forms a phase locked loop which generates 1428 MHz clock signal $LO_2$(24) of FIG. 1 and 178.5 MHz clock signal $LO_4$(52) of FIG. 1 from the $OSC_{GLONASS}$ input signal (126). The $LO_2$ and $LO_4$ signals are used to frequency translate both the L1 and L2 GLONASS signals in the Downconverter (20) and IF Processor (30) blocks of FIG. 1.

The 5.1 MHz signal 126 is compared with the 5.1 MHz signal output from a block "DIVIDE BY 5" (146) in the third phase detector Θ3 (140). The voltage output from the third phase detector Θ3 (140) represents phase alignment of two 5.1 MHz signals and includes two signals, wherein the first of these signals has a large phase error and represents a large voltage output; and wherein the second of these signals has a small phase error and represents a small voltage output. The third Loop Filter 3 (142) filters out the high frequency voltage noise signal having a large phase error and outputs the low frequency noise signal having a small phase error which is applied to the second voltage controlled oscillator (VCO 2) (144). The low frequency noise signal causes frequency change in the VCO 2 output signal (24). When the loop is locked, the VCO 2 output signal having a 1428 MHz frequency is used as the second $LO_2$ (local oscillator) signal. By dividing the $LO_2$ signal by 8, a block "DIVIDE BY 8" (150) outputs the fourth $LO_4$ local oscillator signal (52) having 178.5 MHz. Block "DIVIDE BY 7" (148) divides the $LO_4$ signal and outputs the signal that is used by the "DIVIDE BY 5" block (146) to close the GLONASS Frequency Synthesizer block loop.

FIG. 6 illustrates the GPS Synthesizer block (132) in more detail. The GPS Frequency Synthesizer block (132) forms a phase locked loop which generates 1400 MHz clock signal $LO_1$ (22) of FIG. 1 and 175 MHz clock signal $LO_3$ (54) of FIG. 1 from the $OSC_{GPS}$ input signal (116). The $LO_1$ and $LO_3$ signals are used to frequency translate both the L1 and L2 GPS signals in the Downconverter (20) and IF Processor (30) blocks of FIG. 1.

The 5 MHz signal 116 is compared with the 5 MHz signal output from a block "DIVIDE BY 5" (166) in the fourth phase detector Θ4 (160). The voltage output from the fourth phase detector Θ4 (160) represents phase alignment of two 5 MHz signals and includes two signals, wherein the first of these signals has a large phase error and represents a large voltage output; and wherein the second of these signals has a small phase error and represents a small voltage output. The fourth Loop Filter 4 (162) filters out the high frequency voltage noise signal having a large phase error and outputs the low frequency noise signal having a small phase error which is applied to the third voltage controlled oscillator (VCO 3) (164). The low frequency noise signal causes frequency change in the VCO 3 output signal (22). When the loop is locked, the VCO 3 output signal having a 1400 MHz frequency is used as the first $LO_1$ signal. By dividing the $LO_1$ signal by 8, block (170) "DIVIDE BY 8" outputs the third $LO_3$ local oscillator signal (54) having 175 MHz. Block "DIVIDE BY 7" (168) divides the $LO_3$ signal and outputs the signal that is used by the "DIVIDE BY 5" block (166) to close the GPS Frequency Synthesizer block loop. Block "Divide by 25000" (172) generates the msec clock signal 1 kHz (48).

The Antenna (12) feeds into the Filter/LNA block 14 as shown in FIG. 7. The signal from the Antenna block 12 is power split in the block (180) to form L1 (182) and L2 (184) paths. The L1 path signal is filtered in the filter (186) and low noise amplified in LNA 1 (194). The L1 path filter (186) is wide enough to pass the L1 BAND described in FIG. 2. Similarly, the L2 path signal (184) is filtered and low noise amplified in LNA 2 (196). The L2 path filter (188) is wide enough to pass the L2 BAND described in FIG. 2. The purpose of the low noise amplifiers is to set the Receiver's noise figure to a significantly low value (~1 dB) for quality signal to noise ratio reception. The LNAs should have enough gain to overcome any cable or other losses that occur between the Filter/LNA (14) and Downconverter (20) blocks of FIG. 1. In the preferred embodiment, the Filter/LNA block is physically close to the Antenna block (12).

FIG. 8 illustrates the Downconverter block (20) of FIG. 1. The L1 (16) and L2 (18) signals from the Filter/LNA block of FIG. 7 are frequency converted and further amplified in this block. The L1 signal is power split with one signal providing the GPS L1 signal path and the other signal providing the GLONASS signal path. The L2 signal is similarly split into L2 GLONASS path and L2 GPS path signals. Mixer 1 (212) frequency translates the L1 GPS signal from the center frequency of 1575.42 MHz to 175.42 MHz. Filtering is performed in Filter 1 (214), which has a center frequency of 175.42 MHz and a bandwidth of 25 MHz. Amplifier 1 (216) amplifies the L1 GPS signal providing the output signal $L1_{GPS}$ (26,1). The GPS L2 and GLONASS L1 and L2 signals are similarly processed to form the output signals $L2_{GPS}$ (26,2), $L1_{GLONASS}$ (28,1), and $L2_{GLONASS}$ (28,2). The GLONASS filter center frequencies indicated in FIG. 8 correspond to the center of the L1 and L2 GLONASS transmission bands, as each satellite transmits on a slightly different frequency. The 25 MHz bandwidth filter (226) used for GLONASS L1 signal is narrower than the L1 GLONASS band (27.6575 MHz as shown in FIG. 2) thus cutting off approximately 1 MHz from the low and high edge of the GLONASS L1 band. This will result in a small loss in signal power for GLONASS satellites that transmit frequencies close to the low and high edges of this band. This loss is negligibly small (<1 dB) and will not impact Receiver performance adversely. The reasoning given above is applicable to the GLONASS P code bandwidth. The GLONASS C/A code bandwidth has a narrower bandwidth than the GLONASS P code bandwidth and is not affected by the 25 MHz bandwidth limiting. Thus, all signals are band limited to 25 MHz to satisfy the Nyquist sampling theorem for a subsequent sample rate, sclk, of 25 MHz. This ensures the optimal conversion from the analog to the digital domain which occurs in the IF Processor block of FIG. 9.

FIG. 9 shows the IF Processor (30) of FIG. 1 in more detail. The IF Processor performs frequency translation and digitization operations. The $L1_{GPS}$ signal (26,1) is frequency translated using the $LO_3$ signal (54) and then digitally sampled via the sclk signal (25 MHz) (50) in the IF Downconverter and Sampler 1 block (250). The $L2_{GPS}$ (26,2), $L1_{GLONASS}$ (28,1), and $L2_{GLONASS}$ (28,2) signals are similarly processed in the IF Processor (30).

FIG. 10 depicts a typical IF Downconverter and Sampler of FIG. 9. The input signal $S_i$ (264) is power split and mixed separately with inphase and quadrature versions of the local oscillator signal LO (262) in mixer 1 (270) and in mixer 2 (272). The inphase version of the mixed signal is then filtered in Filter 1 (274), amplified in Amplifier 1 (278) before being hardlimited in Hardlimiter 1 (282) and sampled in flip-flop 1 (286). The output signal 1 (290) represents a frequency translated, filtered, amplified and digitized version of the input signal $S_i$ (264). The quadrature signal is similarly processed.

In one embodiment, the Hardlimiter of FIG. 10 comprises a one-bit quantizer. In another embodiment, the Hardlimiter comprises an n-bit quantizer, n being an integer. If this is the case, the signal-to-noise ratio (SNR) and the anti-jamming performance are improved.

Referring back to FIG. 9, the output signals represent the digitally sampled $I_{L1\ GPS}$ (32,1), $Q_{L1\ GPS}$ (32,2), $I_{L1\ GLONASS}$ (34,1), $Q_{L1\ GLONASS}$ (34,2), $I_{L2\ GPS}$ (36,1), $Q_{L2\ GPS}$ (36,2), $I_{L2\ GLONASS}$ (38,1) and $Q_{L2\ GLONASS}$ (38,2) signals. The L1 and L2 GPS signals are at nominal frequencies of (+420) kHz and (−2.6) MHz respectively. The L1 and L2 GLONASS signals are at nominal frequencies of (+281.25) kHz and (−218.75) kHz respectively. These digital signals are then sent to the Digital Channel Processors of FIG. 1.

FIG. 11 shows a Digital Channel Processor block (40) in more detail. One of the two pairs of digital input signals $I_{L1\ GPS}$ (32,1) and $Q_{L1\ GPS}$ (32,2), or $I_{L1\ GLONASS}$ (36,1) and $Q_{L1\ GLONASS}$ (36,2) are selected for processing in the first Signal Tracker 1 (306) by Multiplexer 1 (300). Similarly, one of the two pairs of digital input signals $I_{L2\ GPS}$ (34,1) and $Q_{L2\ GPS}$ (34,2), or $I_{L2\ GLONASS}$ (38,1) and $Q_{L2\ GLONASS}$ (38,2) are selected for processing in the second Signal Tracker 2 (314) by Multiplexer 2 (308).

In the preferred embodiment, the Digital Channel Processor tracks GPS or GLONASS satellites. For instance, when assigned to track a GPS satellite on L1, the Digital Channel Processor selects $I_{L1\ GPS}$ (32,1) and $Q_{L1\ GPS}$ (32,2) signals via Multiplexer 1 under control signal (44.1) from the μP (42). The selected signals are further processed in the first Signal Tracker 1 (306). The first Signal Tracker 1 block (306) is synchronously clocked at the sclk rate (50) which facilitates the digital signal tracking and code and carrier phase measurements for L1 signal in conjunction with the μP (42).

The process of tracking a GPS satellite on L2, and a GLONASS satellite on L1 and L2 is done similarly by the Digital Channel Processor block (40).

FIG. 12 depicts the Signal Tracker block (380). The Signal Tracker block (380) can represent either Signal Tracker block 1 (306) or the Signal Tracker block 2 (314) of FIG. 11. The operation of the similar block has been fully described by Gary Lennen in the U.S. Pat. No. 5,541,606, that is incorporated herein by reference in its entirety.

The Carrier Mixer (324) is used to frequency translate the incoming I and Q samples to 0 Hz via the Carrier NCO block (342). The Carrier NCO block (342) is controlled by the Microprocessor μP (42) to close the carrier tracking loop.

The Carrier Mixer I (326) and Q (328) output signals are further processed by the Code Mixer block (330) that mixes the I (326) and Q (328) samples with the local code $L_c$ (346) generated by the Code generator (344). The mixing or correlation process performed by the Code Mixer is performed at 3 time points (E-early, P-punctual and L-late) on the autocorrelation function graph formed between the satellite code and local code.

The output of the Code Mixer (330) is integrated over an integer period of C/A epoch signals in the Correlators block (336). However, the output of the Correlators block (336) itself is not sufficient for code tracking because it does not provide an indication of the sign of the delay error of a tracking reference signal. Therefore, in the Delay-Lock Code Loop formed by the Code Mixer (330), Correlators block (336), Code NCO clock (534) and Code Generator block (346), the outputs of the E and L correlation signals are subtracted to form a (E minus L) correlation signal. This correlation (E minus L) signal becomes a number signal which is used to drive a Code numerically-controlled oscillator (NCO) block (354), or clock Code NCO block.

The Code NCO block is a device which takes the sample clock rate, sclk (50), and multiplies it by N/M to produce an output signal $NCO_{OUT}$ (350) used to drive the Code generator block (344).

In the preferred embodiment, the ratio N/M will be 1023/2500 for GPS tracking, making $NCO_{OUT}$=10.23 MHz, and N/M will be 511/2500 for GLONASS tracking making $NCO_{OUT}$=5.11 MHz.

This clock CODE NCO drives the Code Generator block (344) in such a manner that if the clock Code NCO is lagging in phase, the correction signal drives the clock faster and the reference code speeds up and runs in coincidence with the received signal. Thus, the reference code is tracking the received code. The epoch time ticks are then a measure of the received signal time.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Code-Loop will track the incoming signal. Once the code tracking has been accomplished by the Delay-Lock-Code-Loop, the BPSK satellite signal data at 50 bps can be recovered by the punctual channel (P).

FIG. 13 depicts the block Code Generator (344) of FIG. 12. The Code generator block is designed to provide the correct local code $L_c$ (346). The Microprocessor $\mu P$ (42) of FIG. 1 selects the local code from the GPS C/A Generator (402), from the GPS P(Y) Generator (404), from the GLONASS C/A Code Generator (406) or from the GLONASS P Code Generator (408), depending on what signals the Digital Channel Processor is required to track. The Multiplexer 3 (410) is used to make the selection. The clock rates for GPS C/A and P codes are 1.023 MHz and 10.23 MHz respectively. The clock rates for GLONASS C/A and P codes are 0.511 MHz and 5.11 MHz respectively. The "Divide by 10" block (400) is used to provide C/A code clock rate in each case. The codes present in the Code Generator are described fully in the GPS and GLONASS ICDs. See discussion above.

In one embodiment, the disclosed above GPS/GLONASS Receiver is configured to receive and track only $L1_{GPS}$ and $L1_{GLONASS}$ signals.

In another embodiment, the GPS/GLONASS Receiver is configured to receive and track only $L2_{GPS}$ and $L2_{GLONASS}$ signals.

FIG. 14 shows the initialization process for the Digital Channel Processor. The Microprocessor $\mu P$ (42) of FIG. 1 at first decides which satellite system the channel will track (step 430). When more channels are available than satellites the criteria can be the visibility (above the horizon) of a satellite. The Receiver includes an algorithm for computing which satellites are above the horizon based on the orbital almanac information extracted from a single satellite in each (GPS or GLONASS) system. When setting up for a GPS satellite the distinguishing feature of each satellite is its prn X code. The $\mu P$ sets Multiplexers 1 and 2 of FIG. 11 to select $I_{L1\ GPS}$, $Q_{L1\ GPS}$, $I_{L2\ GPS}$, $Q_{L2\ GPS}$ (step 440). Signal Trackers 1 and 2 in this channel will now operate on these signals: Signal tracker 1 on L1, and Signal Tracker 2 on L2.

In one embodiment, the Signal Tracker Code NCOs are set to provide the ratio N/M=1023/2500 (step 450), such that the Code NCO output is 10.23 MHz signal. The Code Generator block is then initialized (step 460) for GPS C/A and P codes (or Y code if the channel is authorized for military use). Normally, C/A code is tracked first to acquire accurate knowledge of satellite time and then a handover operation is performed to set up the GPS P code. GPS currently transmits C/A and P(Y) code on L1 and P(Y) code on L2. However, the Receiver allows the tracking of C/A and P(Y) code on either L1 or L2 frequencies in either Signal Tracker 1 or 2. The next step (470) is to set the expected value of final IF carrier frequency. For GPS L1 this is 420 kHz plus expected L1 Doppler offset between the Receiver and the satellite plus the Receiver clock offset. For GPS L2 this is (-2.6) MHz plus expected L2 Doppler. With code clock (GPS or GLONASS) and type (GPS or GLONASS) known, and the carrier frequency close to the expected value, a search can be started for power from the Correlator block values. If signal power is not found then small adjustments can be made to the Code NCO output phase and the Carrier NCO output frequency to widen the search area (step 480).

If a channel is to track a GLONASS satellite Multiplexers 1 and 2 are set to select signals $I_{L1\ GLONASS}$, $Q_{L1\ GLONASS}$, $I_{L2\ GLONASS}$, $Q_{L2\ GLONASS}$ (step 490).

In one embodiment, the Code NCO N/M value is set to 511/2500 (step 500). The Code generators are set up for GLONASS C/A and P codes. Either C/A or P code can be selected by each Signal Tracker (step 510). The $\mu P$ identifies each GLONASS satellite by its satellite vehicle identification number (SV_ID) acquired from the GLONASS almanac data. This GLONASS almanac data can be related to the nominal carrier transmission frequency of a particular satellite. So, although GLONASS C/A and P codes are identical C/A and P codes for all GLONASS satellites, the nominal carrier transmission frequency is unique for each GLONASS satellite currently in view. The Carrier NCOs in Signal Trackers 1 and 2 are set to the expected nominal L1 and L2 frequency plus Doppler (step 520). The Digital Channel Processor is ready for the signal power search (step 480).

Once lock has been successfully established on GPS or GLONASS satellite, the Receiver takes and processes code and carrier phase measurements. The process of performing code and carrier phase measurements has been fully described in the U.S. Pat. No. 5,541,606 issued to Lennen. The U.S. Pat. No. 5,541,606 is incorporated herein by reference in its entirety.

To combine the GPS and GLONASS measurements into one navigational solution, one has to take into account the following considerations. The standard GPS or GLONASS pseudo range is formed from:

$$\rho = R + c\Delta t_{Receiver}; \quad (1)$$

wherein $\rho$ is the measured pseudo range, R is the actual range from the satellite to user, c is the speed of light, and $\Delta t_{Receiver}$ is the Receiver time offset from the satellite system time (GPS or GLONASS).

When combining GPS and GLONASS pseudo ranges into the same solution we must also take into account the offset between the GPS and GLONASS system times, e.g.:

$$\rho = R + c\Delta t_{Receiver} + c\Delta t_{System}; \quad (2)$$

wherein the additional term $c\Delta t_{System}$ represents the time offset between the GPS and GLONASS system times. Currently, this term is of the order of one microsecond, which translates into 300 meters in distance. If unaccounted for, this term can cause a significant error in position.

FIG. 15 depicts the flow of information in the $\mu$P when processing pseudo ranges to solve for position, velocity and time. Firstly, all pseudo range measurements are smoothed (step 540) by their equivalent carrier phase measurements, providing lower noise pseudo ranges.

If only GPS pseudo ranges are available, then the standard and well documents solution for the system of simultaneous equations formed by the equation (1) for each GPS satellite is solved (step 550). The position and velocity solution will be in the GPS systems's coordinate reference frame known as WGS 84, and the timing solution will be with reference to GPS system time or UTC (USNO=United States Naval Observatory) (step 560). The offset between the GPS time and the UTC (USNO=United States Naval Observatory) time is transmitted by GPS satellites as a varying parameter in the data stream.

Similarly, if only GLONASS pseudo ranges are available, the standard solution to a system of equations of the type (1) is obtained (step 570). However, in this embodiment, the resulting position and velocity are obtained in the coordinate system SGS 90, and the timing solution is referenced to GLONASS system time or UTC (SU=Soviet Union) (step 580).

When both GPS and GLONASS pseudo ranges are available the equation (2) should be used. This equation requires the extra satellite to solve for the additional term $c\Delta t_{System}$ representing the time offset between the GPS and GLONASS system times (step 590).

The position solution is a composite of coordinate systems WGS 84 and SGS 90. The offset between the two is not known exactly yet but is known to be less than 10 meters in any axis. When this offset becomes known it can be utilized to scale and rotate the pseudo range from one satellite system (GPS or GLONASS) into the coordinate reference frame of the other satellite system (GLONASS or GPS). The timing solution provides a measure of the offset between GPS and GLONASS system times and hence accurate time referenced to the GPS system time, GLONASS system time, UTC(USNO) or UTC(SU) can be presented to the user (step 600).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for receiving satellite signals generated by a GPS satellite system and a GLONASS satellite system, wherein said GPS system generates $L1_{GPS}$ and $L^2GPS$ signals, wherein said GLONASS system generates $L1_{GLONASS}$ and $L^2GLONASS$ signals; said apparatus comprising:

a Receiver circuit configured to receive the satellite signals from each said satellite system; said Receiver circuit further including:
   an Antenna configured to receive said $L1_{GPS}$, $L2_{GPS}$, $L1_{GLONASS}$, and $L2_{GLONASS}$ signals;
   a Filter/LNA circuit conductively connected to said Antenna, wherein said Filter/LNA is configured to perform the filtering and low noise amplification of said $L1_{GPS}$, $L2_{GPS}$, $L1_{GLONASS}$, and $L2_{GLONASS}$ signals; wherein said Filter/LNA determines the signal-to-noise (SNR) ratio of the received signals;
   a Downconverter circuit conductively connected to said Filter/LNA, wherein said Downconverter is configured to convert down in frequency said $L1_{GPS}$, $L2_{GPS}$, $L1_{GLONASS}$, and $L2_{GLONASS}$ signals; and
   an IF processor conductively connected to said Downconverter, wherein said IF processor is configured for further frequency translating and digitizing said $L1_{GPS}$, $L2_{GPS}$, $L1_{GLONASS}$, and $L2_{GLONASS}$ signals;

a plurality of Digital Channel Processor circuits connected to said Receiver circuit, wherein each said Digital Channel Processor is configured to process received satellite signals emanating from a single satellite; and a Microprocessor connected to each said Digital Channel Processor, wherein said Microprocessor is configured to extract the navigational information from each said received satellite signal.

2. The apparatus of claim 1 further comprising a master oscillator block configured to generate a single clock frequency MASTER_CLK, a GPS clock frequency $OSC_{GPS}$, and a GLONASS clock frequency $OSC_{GLONASS}$, wherein said GPS clock frequency $OSC_{GPS}$ and GLONASS clock frequency $OSC_{GLONASS}$ are both derived from said single clock frequency MASTER_CLK.

3. The apparatus of claim 2 further comprising a frequency synthesizer connected to said master oscillator, wherein said frequency synthesizer is configured to synthesize $LO_1$, $LO_2$, $LO_3$, $LO_4$, msec, and sclk clock signals.

4. The apparatus of claim 2, wherein said master oscillator further comprises:
   a master clock generator configured to generate a MASTER_CLK frequency signal;
   a first divider block connected to said master clock generator, wherein said first divider is configured to divide said MASTER_CLK frequency signal and configured to generate said OSCGPS frequency clock signal;
   a first phase detector connected to said first divider block, wherein said first phase detector is configured to phase detect said first divided MASTER_CLK signal against a first reference signal;
   a first loop Filter connected to said first phase detector, wherein said first loop Filter is configured to filter out high the high frequency component signal and to output a first filtered signal, wherein said first filtered signal includes low frequency voltage noise;
   a second phase detector connected to said first loop Filter, wherein said second phase detector is configured to phase compare said first filtered signal against a second reference signal;

a second loop Filter connected to said second phase detector, wherein said second loop Filter is configured to filter out high and low frequency voltage noise in order to close the phase-locked loop;

a first voltage controlled oscillator (VCO$_1$) connected to said second loop Filter, wherein said VCO$_1$ is configured to generate said first reference signal and said OSC$_{GLONASS}$ signal; and a second divider block connected to said first divider block, wherein said second divider is configured to generate said second reference signal.

5. The apparatus of claim 2, wherein said master oscillator further comprises:

a master clock generator configured to generate a 10 MHZ (MASTER_CLK) frequency signal;

a "Divide by 2" block connected to said master clock generator, wherein said "Divide by 2" block is configured to divide said 10 MHZ frequency signal and configured to generate a 5 MHz (OSC$_{GPS}$) frequency clock signal;

a first phase detector connected to said "Divide by 2" block, wherein said first phase detector is configured to phase detect said 5 MHz signal against a first reference signal;

a first loop Filter connected to said first phase detector, wherein said first loop Filter is configured to filter out high the high frequency component signal and to output a first filtered (100 kHz) signal, wherein said first filtered (100 kHz) signal includes low frequency voltage noise;

a second phase detector connected to said first loop Filter, wherein said second phase detector is configured to phase compare said first filtered 100 kHz signal against a second reference 100 kHz signal;

a second loop Filter connected to said second phase detector, wherein said second loop Filter is configured to filter out high and low frequency voltage noise in order to close the phase-locked loop;

a first voltage controlled oscillator (VCO$_1$) connected to said second loop Filter, wherein said VCO$_1$ is configured to generate said first reference (5.1 MHz) signal and said 5.1 MHz (OSC$_{GLONASS}$) signal; and a "Divide by 50" block connected to said "Divide by 2" block, wherein said second divider is configured to generate said second reference 100 kHz signal.

6. The apparatus of claim 3, wherein said frequency synthesizer block further comprises a GLONASS synthesizer block and a GPS synthesizer block.

7. The apparatus of claim 6, wherein said GLONASS synthesizer block further comprises:

a "Divide by 5" block configured to generate a third reference signal;

a third phase detector connected to said "Divide by 5" block, wherein said third phase detector is configured to compare said 5.1 MHz (OSC$_{GLONASS}$) signal with said third reference signal;

a third loop Filter circuit connected to said third phase detector, wherein said third loop Filter is configured to filtering out high frequency voltage noise;

a second voltage controlled oscillator (VCO$_2$) connected to said third loop Filter, wherein said VCO$_2$ is configured to generate said LO$_2$ (1428 MHz) clock signal;

a "Divide by 8" block connected to said VCO$_2$, wherein said "Divide by 8" block is configured to divide said 1428 MHz VCO$_2$ output signal by 8 to obtain said LO$_4$ (178.5 MHz) clock signal;

a "Divide by 7" block connected to said "Divide by 8" block, wherein said "Divide by 7" block is configured to divide said 178.5 MHz signal by 7 to obtain a 25.5 MHz signal; and a "Divide by 5" block connected to said "Divide by 7" block, wherein said "Divide by 5" block is configured to divide said 25.5 MHz signal by 5 to obtain said third reference (5.1 MHz) signal.

8. The apparatus of claim 6, wherein said GPS synthesizer block further comprises:

a "Divide by 5" block configured to generate a fourth reference signal;

a fourth phase detector connected to said "Divide by 5" block, wherein said fourth phase detector is configured to compare said 5 MHz (OSC$_{GPS}$) signal with said fourth reference signal;

a fourth loop Filter circuit connected to said fourth phase detector, wherein said fourth loop filer is configured to filter out the high frequency voltage noise;

a third voltage controlled oscillator (VCO$_3$) connected to said fourth loop Filter, wherein said VCO$_3$ is configured to generate said LO$_1$ (1400 MHz) clock signal;

a "Divide by 8" block connected to said VC0$_3$, wherein said "Divide by 8" block is configured to divide said 1400 MHz VCO output signal by 8 to obtain said LO$_3$ (175 MHz) clock signal;

a "Divide by 7" block connected to said "Divide by 8" block, wherein said "Divide by 7" block is configured to divide said 175 MHz signal by 7 to obtain said sclk (25 MHz) wide digital sampling clock signal;

a "Divide by 5" block connected to said "Divide by 7" block, wherein said "Divide by 5" block is configured to divide said 25 MHz signal by 5 to obtain said fourth reference (5 MHz) signal; and a "Divide by 25000" block connected to said "Divide by 5" block, wherein said "Divide by 25000" block is configured to generate a 1 kHz (msec) clock signal used by each said Digital Channel Processor as a reference clock timing signal.

9. The apparatus of claim 1, wherein said filter/LNA circuit further comprises:

a power splitter connected to said Antenna, wherein said power splitter is configured to power split a single L1/L2 signal received by said Antenna into two separate L1 and L2 signal paths, and wherein said L1 signal has bandwidth L1_BAND that includes both L1$_{GPS}$ and L1$_{GLONASS}$ signals; and wherein said L2 signal has bandwidth L2_BAND to include both L2$_{GPS}$ and L2$_{GLONASS}$ signals;

a first Bandpass Filter connected to said power splitter, wherein said first Bandpass Filter is configured to filter said L1 signal, and wherein said first Bandpass Filter has a bandwidth at least as wide as the L1_BAND bandwidth;

a second Bandpass Filter connected to said power splitter, wherein said second Bandpass Filter is configured to filter said L2 signal, and wherein said second Bandpass Filter has a bandwidth at least as wide as the L2_BAND bandwidth;

a first low noise amplifier (LNA$_1$) connected to said first Bandpass Filter, wherein said first low noise amplifier is configured to maintain the signal-to noise ratio (SNR) of said apparatus in the L1 path; and a second low noise amplifier (LNA$_2$) connected to said second Bandpass Filter, wherein said second low noise amplifier is configured to maintain the signal-to noise ratio (SNR) of said apparatus in the L2 path.

10. The apparatus of claim 1, wherein said Downconverter circuit further comprises:

a first power splitter configured to split the L1 signal generated by said first LNA$_1$ amplifier into the L1__GPS signal path and into the L1__GLONASS signal path;

a second power splitter connected to said first power splitter, wherein said second power splitter is configured to split the L2 signal generated by said second LNA$_2$ amplifier into the L2__GPS signal path and into the L2__GLONASS signal path;

a first mixer connected to said first power splitter, wherein said first mixer is configured to frequency translate the L1 GPS signal from center frequency 1575.42 MHz to 175.42 MHz;

a first Filter connected to said first mixer, wherein said first Filter has a center frequency of 175.42 MHz and a bandwidth of 25 MHz, and wherein said first Filter is configured to output the L1 GPS signal having 175.42 MHz frequency;

a fist amplifier connected to said first Filter, wherein said first amplifier is configured to amplify said L1 GPS signal and outputs an L1$_{GPS}$ signal;

a second mixer connected to said first power splitter, wherein said second mixer is configured to frequency translate the L1 GLONASS signal from center frequency 1606.78125 MHz to 178.78125 MHz;

a second Filter connected to said second mixer, wherein said second Filter has a center frequency of 178.78125 MHz and a bandwidth of 25 MHz, and wherein said second Filter is configured to output the L1 GLONASS signal having 178.78125 MHz frequency;

a second amplifier connected to said second Filter, wherein said second amplifier is configured to amplify said L1 GLONASS signal and outputs an L1$_{GLONASS}$ signal;

a third mixer connected to said second power splitter, wherein said third mixer is configured to frequency translate the L2 GPS signal from center frequency 1227.6 MHz to 172.4 MHz;

a third Filter connected to said third mixer, wherein said third Filter has a center frequency of 172.4 MHz and a bandwidth of 25 MHz, and wherein said third Filter is configured to output the L2 GPS signal having 172.4 MHz frequency;

a third amplifier connected to said third Filter, wherein said third amplifier is configured to amplify said L2 GPS signal and outputs an L2$_{GPS}$ signal;

a fourth mixer connected to said second power splitter, wherein said fourth mixer is configured to frequency translate the L2 GLONASS signal from center frequency 1249.71875 MHz to 178.28125 MHz;

a fourth Filter connected to said fourth mixer, wherein said fourth Filter has a center frequency of 178.28125 MHz and a bandwidth of 25 MHz, and wherein said fourth Filter is configured to output the L2 GLONASS signal having 178.28125 MHz frequency; and a fourth amplifier connected to said fourth Filter, wherein said fourth amplifier is configured to amplify said L2 GLONASS signal and outputs an L2$_{GLONASS}$ signal.

11. The apparatus of claim 1, wherein said IF processor further comprises:

a first IF Downconverter and Sampler block configured to frequency translate to 420 kHz the L1$_{GPS}$ signal using the LO$_3$ clock signal and to digitally sample the 420 kHz L1$_{GPS}$ signal using the sclk signal in order to generate the inphase and quadrature components I$_{L1\ GPS}$ and Q$_{L1\ GPS}$;

a second IF Downconverter and Sampler block configured to frequency translate to (−2.6) MHz the L2$_{GPS}$ signal using the LO$_3$ clock signal and to digitally sample the (−2.6) MHz L2$_{GPS}$ signal using the sclk signal in order to generate the inphase and quadrature components I$_{L2\ GPS}$ and Q$_{L2\ GPS}$;

a third IF Downconverter and Sampler block configured to frequency translate to 281.25 kHz the L1$_{GLONASS}$ signal using the LO$_4$ clock signal and to digitally sample the 281.25 kHz L1$_{GLONASS}$ signal using the sclk signal in order to generate the inphase and quadrature components I$_{L1\ GLONASS}$ and Q$_{L1\ GLONASS}$; and a fourth IF Downconverter and Sampler block configured to frequency translate to (−218.75) kHz the L2$_{GLONASS}$ signal using the LO$_4$ clock signal and to digitally sample the (−218.75) kHz L2$_{GLONASS}$ signal using the sclk signal in order to generate the inphase and quadrature components I$_{L2\ GLONASS}$ and Q$_{L2\ GLONASS}$.

12. The apparatus of claim 11, wherein each said IF Downconverter and Sampler block further comprises:

a power splitter configured to split the input signal S$_i$ into two components S$_{i1}$ and S$_{i2}$;

a first mixer connected to said power splitter, wherein said first mixer is configured to mix the S$_{i1}$ signal with the inphase component of the local clock signal LO to generate the frequency translated (S$_{i1}$−Inphase LO) signal;

a first low pass Filter connected to said first mixer, wherein said first low pass Filter is configured to pass the low frequency component of the mixed (S$_{i1}$−Inphase LO) signal;

a first amplifier connected to said first low pass Filter, wherein said first amplifier is configured to amplify the low frequency component of the (S$_{i1}$−Inphase LO) signal;

a first quantizer connected to said first amplifier, wherein said first quantizer is configured to quantize the low frequency component of the (S$_{i1}$−Inphase LO) signal;

a first flip-flop connected to said first quantizer, wherein said first flip-flop is configured to sample the quantized (S$_{i1}$−Inphase LO) signal;

a second mixer connected to said power splitter, wherein said second mixer is configured to mix the S$_{i2}$ signal with the quadrature component of the local clock signal LO to generate the frequency translated (S$_{i2}$−Quadrature LO) signal;

a second low pass Filter connected to said second mixer, wherein said second low pass Filter is configured to pass the low frequency component of the mixed (S$_{i2}$−Quadrature LO) signal;

a second amplifier connected to said second low pass Filter, wherein said second amplifier is configured to amplify the low frequency component of the (S$_{i2}$−Quadrature LO) signal;

a second quantizer connected to said second amplifier, wherein said second quantizer is configured to quantize the low frequency component of the (S$_{i2}$−Quadrature LO) signal; and a second flip-flop connected to said second quantizer, wherein said second flip-flop is configured to sample the quantized ($S_{i2}$–Quadrature LO) signal.

13. The apparatus of claim 12, wherein said first quantizer comprises a 1-bit quantizer; and wherein said second quantizer comprises a 1-bit quantizer.

14. The apparatus of claim 12, wherein said first quantizer comprises a multi-bit quantizer; and wherein said second quantizer comprises a multi-bit quantizer.

15. The apparatus of claim 1, wherein each said Digital Channel Processor circuit further comprises:
- a first multiplexer configured to select for further processing the $I_{L1\ GPS}$, $Q_{L1\ GPS}$, $I_{L1\ GLONASS}$, and $Q_{L1\ GLONASS}$ signals;
- a first signal tracker connected to said first multiplexer, wherein said first signal tracker is configured to process the $I_{L1\ GPS}$, $Q_{L1\ GPS}$, $I_{L1\ GLONASS}$, and $Q_{L1\ GLONASS}$ signals;
- a second multiplexer configured to select for further processing the $I_{L2\ GPS}$, $Q_{L2\ GPS}$, $I_{L2\ GLONASS}$, and $Q_{L2\ GLONASS}$ signals; and
- a second signal tracker connected to said second multiplexer, wherein said second signal tracker is configured to process the $I_{L2\ GPS}$, $Q_{L2\ GPS}$, $I_{L2\ GLONASS}$, and $Q_{L2\ GLONASS}$ signals;
- wherein said first signal tracker and said second signal tracker are synchronously clocked at the sclk clock rate to facilitate the digital signal tracking and code and carrier phase measurements for L1 and L2 signals in conjunction with said Microprocessor system $\mu$P.

16. The apparatus of claim 15, wherein each said signal tracker further comprises:
- a carrier mixer configured to further frequency translate the I and Q components of the incoming satellite signals to d. c. carrier frequency (0 Hz carrier frequency) I and Q components of the incoming satellite signals;
- a carrier numerically controlled oscillator (NCO) circuit connected to said carrier mixer, wherein said block carrier NCO is configured to close the carrier tracking loop via the control of said Microprocessor system $\mu$P;
- a code mixer circuit connected to said carrier mixer, wherein said code mixer is configured to mix the d. c. I and Q carrier components of the incoming satellite signals with the locally generated code $L_c$ signals at three time points Early (E), Punctual (P), and Late (L) on the autocorrelation function formed between the satellite code and local code;
- a code generator connected to said code mixer, wherein said code generator is configured to generate the code signals $L_c$;
- a code NCO connected to said code generator, wherein said code NCO is configured to drive said code generator; and
- a correlators block connected to said code mixer, wherein said correlators block is configured to integrate the signals outputted by said code mixer over an integer period of C/A epoch signals;
- wherein said Microprocessor system $\mu$P uses said correlators output signal to form the code and carrier tracking loops via the feedback to said code NCO and said carrier NCO.

17. The apparatus of claim 16, wherein said code generator further comprises:
- a GPS C/A code generator configured to generate a GPS C/A code signal;
- a GPS P(Y) code generator configured to generate a GPS P(Y) code signal;
- a GLONASS C/A code generator configured to generate a GLONASS C/A code signal;
- a GLONASS P code generator configured to generate a GLONASS P code signal; and
- a multiplexer 3 configured to select the local code $L_c$ from GPS C/A, GPS P(Y), GLONASS C/A, and GLONASS C/A locally generated codes depending on what signals said Digital Channel Processor is required to track.

18. The apparatus of claim 1, wherein said GPS system generates $L1_{GPS}$ signal, wherein said GLONASS system generates $L1_{GLONASS}$ signal; and wherein said Receiver circuit further includes:
- an Antenna configured to receive said $L1_{GPS}$ and $L1_{GLONASS}$ signals;
- a Filter/LNA circuit conductively connected to said Antenna, wherein said Filter/LNA is configured to perform the filtering and low noise amplification of said $L1_{GPS}$ and $L1_{GLONASS}$ signals; wherein said Filter/LNA determines the signal-to-noise ratio (SNR) of the received signals;
- a Downconverter circuit conductively connected to said Filter/LNA, wherein said Downconverter is configured to convert down in frequency said $L1_{GPS}$ and L1 $_{GLONASS}$ signals; and
- an IF processor conductively connected to said Downconverter, wherein said IF processor is configured to further frequency translate and digitize said $L1_{GPS}$ and $L1_{GLONASS}$ signals.

19. The apparatus of claim 1, wherein each said Digital Channel Processor circuit further comprises:
- a multiplexer configured to select for further processing the $I_{L1\ GPS}$, $Q_{L1\ GPS}$, $I_{L1\ GLONASS}$, and $Q_{L1\ GLONASS}$ signals; and
- a signal tracker connected to said first multiplexer, wherein said signal tracker is configured to process the $I_{L1\ GPS}$, $Q_{L1\ GPS}$, $I_{L1\ GLONASS}$, and $Q_{L1\ GLONASS}$ signals;
- wherein said signal tracker and said signal tracker are synchronously clocked at the sclk clock rate to facilitate the digital signal tracking and code and carrier phase measurements for $L1_{GPS}$ and $L1_{GLONASS}$ signals in conjunction with said Microprocessor system $\mu$p.

20. The apparatus of claim 1, wherein said GPS system generates $L2_{GPS}$ signal, wherein said GLONASS system generates $L2_{GLONASS}$ signal; and wherein said Receiver circuit further includes:
- an Antenna configured to receive said $L2_{GPS}$ and $L2_{GLONASS}$ signals;
- a Filter/LNA circuit conductively connected to said Antenna, wherein said Filter/LNA is configured to perform the filtering and low noise amplification of said $L2_{GPS}$ and $L2_{GLONASS}$ signals; wherein said Filter/LNA determines the signal-to-noise ratio (SNR) of the received signals;
- a Downconverter circuit conductively connected to said Filter/LNA, wherein said Downconverter is configured to convert down in frequency said $L2_{GPS}$ and $L2_{GLONASS}$ signals; and
- an IF processor conductively connected to said Downconverter, wherein said IF processor is configured to further frequency translate and digitize said $L2_{GPS}$ and $L2_{GLONASS}$ signals.

21. The apparatus of claim 1, wherein each said Digital Channel Processor circuit further comprises:

a multiplexer configured to select for further processing the $I_{L2\ GPS}$, $Q_{L2\ GPS}$, $I_{L2\ GLONASS}$, and $Q_{L2\ GLONASS}$ signals; and a signal tracker connected to said first multiplexer, wherein said signal tracker is configured to process the $I_{L2\ GPS}$, $Q_{L2\ GPS}$, $I_{L2\ GLONASS}$, and $Q_{L2\ GLONASS}$ signals; wherein said signal tracker and said signal tracker are synchronously clocked at the sclk clock rate to facilitate the digital signal tracking and code and carrier phase measurements for $L2_{GPS\ and\ L2GLONASS}$ signals in conjunction with said Microprocessor system $\mu P$.

22. A method for receiving satellite signals generated by GPS and GLONASS satellite systems, each said satellite system comprising a plurality of satellites, said method employing an apparatus comprising a Receiver circuit, a plurality of Digital Channel Processor circuits, wherein each said Digital Channel Processor is configured to track one said satellite, and a Microprocessor, said method comprising the steps of:

(a) selecting the GPS or GLONASS satellite system;

(b) if the GPS system is selected, tracking first said GPS satellite and extracting from the tracked satellite signals prn X(1) code;

(c) computing which GPS satellites are above the horizon based on the orbital almanac information extracted from said first GPS satellite prn X(1) code, wherein each said (i) GPS satellite has its unique prn X(i) code, 'i' being an integer;

(d) selecting said second GPS satellite for tracking by determining its prn X(2) code and by determining carrier frequencies of L1 and L2 signals for said second GPS satellite;

(e) setting the correct code clock rate for said second GPS satellite;

(f) initializing the generator of local code signals;

(g) generating locally the GPS C/A;

(h) tracking C/A code;

(i) performing a handover operation to locally generate the GPS P code;

(j) setting the expected value of final intermediate carrier frequency, wherein for tracking the L1 GPS signal the expected carrier frequency is equal to (420 kHz+ Doppler offset between said apparatus and said satellite being tracked), and wherein for L2 GPS signal the expected carrier frequency is equal to (−2.6 MHz+ Doppler offset between said apparatus and said satellite being tracked);

(k) searching for signal power by adjusting the locally generated signals;

(l) repeating said steps (d)–(k) for 'k' number of visible GPS satellite, wherein 'k' is less or equal to the number of all visible GPS satellites, k being an integer;

(m) if the GLONASS satellite system is selected, tracking a GLONASS satellite;

(n) identifying a plurality of visible GLONASS satellites by the GLONASS satellite vehicle identification number SV_ID Y acquired from the GLONASS almanac data obtained from said tracked GLONASS satellite, wherein although the GLONASS C/A and P codes are identical C/A and P codes for all GLONASS satellites, the nominal carrier transmission frequency is unique for each said GLONASS satellite;

(o) selecting one said visible Y GLONASS satellite for tracking;

(p) setting the correct code clock rate for said selected Y GLONASS satellite;

(q) initializing the generator of local code signals;

(r) generating locally the GLONASS C/A and P codes;

(s) setting the carrier frequency to expected nominal frequency for said Y GLONASS satellite plus Doppler offset between said apparatus and said Y GLONASS satellite;

(t) searching for signal power by adjusting the locally generated signals; and (y) repeating said steps (o)–(t) for 'm' number of visible GLONASS satellite, wherein 'm' is less or equal to the number of all visible GLONASS satellites.

23. A method for combined GPS/GLONASS measurement processing after the lock on a GPS satellite and a lock on a GLONASS satellite is acquired, said method employing an apparatus comprising a Receiver circuit, a plurality of Digital Channel Processor circuits, wherein each said Digital Channel Processor is configured to track one said GPS or GLONASS satellite, and a Microprocessor, said method comprising the steps of:

smoothing a GPS satellite pseudo range measurement with said GPS satellite's equivalent carrier phase measurements to obtain the resulting position and velocity solution in the WGS 84 coordinate reference system and the time solution referenced to GPS system time or UTC (USNO);

smoothing a GLONASS satellite pseudo range measurement with said GLONASS satellite's equivalent carrier phase measurements to obtain the resulting position and velocity solution in the SGS 90 coordinate reference system and the time solution referenced to GLONASS system time or UTC (SU); and using combined GPS/GLONASS pseudo range measurements with combined GPS/GLONASS carrier phase measurements to obtain the resulting position and velocity solution in the composite WGS 84 and SGS 90 coordinate reference systems and the time solution that provides the offset between GPS and GLONASS system times.

24. The method of claim 23, wherein if the transformation matrix is available for transformation the WGS 84 coordinate system into the SGS 90 coordinate system, said method further comprises the step of:

transforming the obtained pseudo range measurements from the WGS 84 coordinate system to the SGS 90 coordinate system and vice versa.

25. A method for receiving satellite signals generated by GPS and GLONASS satellite systems, each said satellite system comprising a plurality of satellites, said method employing an apparatus comprising a Receiver circuit, a plurality of Digital Channel Processor circuits, wherein each said Digital Channel Processor is configured to track one said satellite, and a Microprocessor, said method comprising the steps of:

(a) selecting the GPS or GLONASS satellite system;

(b) if the GPS system is selected, tracking first said GPS satellite and extracting from the tracked satellite signals prn X(1) code;

(c) computing which GPS satellites are above the horizon based on the orbital almanac information extracted from said first GPS satellite prn X(1) code, wherein each said (i) GPS satellite has its unique prn X(i) code, 'i' being an integer;

(d) selecting said second GPS satellite for tracking by determining its prn X(2) code and by determining carrier frequencies of L1 signal for said second GPS satellite;

(e) setting the correct code clock rate for said second GPS satellite;

(f) initializing the generator of local code signals;

(g) generating locally the GPS C/A;

(h) tracking C/A code;

(i) performing a handover operation to locally generate the GPS P code;

(j) setting the expected value of final intermediate carrier frequency, wherein for tracking the L1 GPS signal the expected carrier frequency is equal to (420 kHz+ Doppler offset between said apparatus and said satellite being tracked);

(k) searching for signal power by adjusting the locally generated signals;

(l) repeating said steps (d)–(k) for 'k' number of visible GPS satellite, wherein 'k' is less or equal to the number of all visible GPS satellites, k being an integer;

(m) if the GLONASS satellite system is selected, tracking a GLONASS satellite;

(n) identifying a plurality of visible GLONASS satellites by the GLONASS satellite vehicle identification number SV_ID Y acquired from the GLONASS almanac data obtained from said tracked GLONASS satellite, wherein although the GLONASS C/A and P codes are identical C/A and P codes for all GLONASS satellites, the nominal carrier transmission frequency is unique for each said GLONASS satellite;

(o) selecting one said visible Y GLONASS satellite for tracking;

(p) setting the correct code clock rate for said selected Y GLONASS satellite;

(q) initializing the generator of local code signals;

(r) generating locally the GLONASS C/A and P codes;

(s) setting the carrier frequency to expected nominal frequency for said Y GLONASS satellite plus Doppler offset between said apparatus and said Y GLONASS satellite;

(t) searching for signal power by adjusting the locally generated signals; and (y) repeating said steps (o)–(t) for 'm' number of visible GLONASS satellite, wherein 'm' is less or equal to the number of all visible GLONASS satellites.

26. A method for receiving satellite signals generated by GPS and GLONASS satellite systems, each said satellite system comprising a plurality of satellites, said method employing an apparatus comprising a Receiver circuit, a plurality of Digital Channel Processor circuits, wherein each said Digital Channel Processor is configured to track one said satellite, and a Microprocessor, said method comprising the steps of:

(a) selecting the GPS or GLONASS satellite system;

(b) if the GPS system is selected, tracking first said GPS satellite and extracting from the tracked satellite signals prn X(1) code;

(c) computing which GPS satellites are above the horizon based on the orbital almanac information extracted from said first GPS satellite prn X(1) code, wherein each said (i) GPS satellite has its unique prn X(i) code, 'i' being an integer;

(d) selecting said second GPS satellite for tracking by determining its prn X(2) code and by determining carrier frequencies of L2 signal for said second GPS satellite;

(e) setting the correct code clock rate for said second GPS satellite;

(f) initializing the generator of local code signals;

(g) generating locally the GPS C/A;

(h) tracking C/A code;

(i) performing a handover operation to locally generate the GPS P code;

(j) setting the expected value of final intermediate carrier frequency, wherein for tracking the L2 GPS signal the expected carrier frequency is equal to (−2.6 MHz+ Doppler offset between said apparatus and said satellite being tracked);

(k) searching for signal power by adjusting the locally generated signals;

(l) repeating said steps (d)–(k) for 'k' number of visible GPS satellite, wherein 'k' is less or equal to the number of all visible GPS satellites, k being an integer;

(m) if the GLONASS satellite system is selected, tracking a GLONASS satellite;

(n) identifying a plurality of visible GLONASS satellites by the GLONASS satellite vehicle identification number SV_ID Y acquired from the GLONASS almanac data obtained from said tracked GLONASS satellite, wherein although the GLONASS C/A and P codes are identical C/A and P codes for all GLONASS satellites, the nominal carrier transmission frequency is unique for each said GLONASS satellite;

(o) selecting one said visible Y GLONASS satellite for tracking;

(p) setting the correct code clock rate for said selected Y GLONASS satellite;

(q) initializing the generator of local code signals;

(r) generating locally the GLONASS C/A and P codes;

(s) setting the carrier frequency to expected nominal frequency for said Y GLONASS satellite plus Doppler offset between said apparatus and said Y GLONASS satellite;

(t) searching for signal power by adjusting the locally generated signals; and (y) repeating said steps (o)–(t) for 'm' number of visible GLONASS satellite, wherein 'm' is less or equal to the number of all visible GLONASS satellites.

* * * * *